US007102422B1

(12) United States Patent
Sawada et al.

(10) Patent No.: US 7,102,422 B1
(45) Date of Patent: Sep. 5, 2006

(54) SEMICONDUCTOR BOOSTER CIRCUIT HAVING CASCADED MOS TRANSISTORS

(75) Inventors: Kikuzo Sawada; Yoshikazu Sugawara, both of Tokyo (JP)

(73) Assignee: Nippon Steel Corporation, Tokyo (JP)

( * ) Notice: Subject to any disclaimer, the term of this patent is extended or adjusted under 35 U.S.C. 154(b) by 0 days.

(21) Appl. No.: 08/423,089

(22) Filed: Apr. 18, 1995

(30) Foreign Application Priority Data

| Apr. 20, 1994 | (JP) | ............................................. | 6-104672 |
| Apr. 20, 1994 | (JP) | ............................................. | 6-104673 |
| May 31, 1994 | (JP) | ............................................. | 6-141113 |
| Aug. 31, 1994 | (JP) | ............................................. | 6-230358 |

(51) Int. Cl.
*G05F 3/02* (2006.01)

(52) U.S. Cl. ........................ 327/536; 327/537; 327/566

(58) Field of Classification Search ................. 327/534, 327/536, 537, 564, 565, 566
See application file for complete search history.

(56) References Cited

U.S. PATENT DOCUMENTS

| 4,574,203 | A | * | 3/1986 | Baba | ........................... | 327/165 |
| 4,970,409 | A | * | 11/1990 | Wada et al. | ................. | 327/541 |
| 5,029,063 | A | * | 7/1991 | Lingstaedt et al. | ......... | 327/534 |
| 5,029,282 | A | * | 7/1991 | Ito | ............................... | 327/537 |
| 5,043,858 | A | | 8/1991 | Watanabe | .................... | 363/63 |
| 5,157,280 | A | * | 10/1992 | Schreck et al. | ............. | 327/537 |

FOREIGN PATENT DOCUMENTS

| EP | 0 319 063 | 6/1989 |
| EP | 0 349 495 | 1/1990 |
| EP | 0 485 016 | 5/1992 |
| EP | 0 591 022 | 12/1996 |
| JP | 57 110076 | 7/1982 |
| JP | A-61-254 078 | 11/1986 |

OTHER PUBLICATIONS

Analysis and Modeling of On–Chip High–Voltage Generator Circuits for Use in EEPROM Circuits (IEEE Journal of Solid–State Circuits, vol. 24, No. 5, Oct. 1989.

* cited by examiner

*Primary Examiner*—Terry D. Cunningham
(74) *Attorney, Agent, or Firm*—Connolly Bove Lodge & Hutz LLP

(57) ABSTRACT

The semiconductor booster circuit includes a plurality of stages, each of which has a MOS transistor and two capacitors. The MOS transistor, having a drain, a source and a gate, is formed in a well of a substrate portion. One capacitor has a terminal connected to the drain of the MOS transistor, while the other capacitor has a terminal connected to the gate of the MOS transistor. A first clock signal generating means generate a first clock signal via another terminal of one capacitor. A second clock signal generating mean s generate a second clock signal, with a larger amplitude than a power supply voltage, via another terminal of another capacitor. The plurality of stages are cascaded together, and in each of the stages the source of the MOS transistor is electrically connected to the well in which the transistor is formed, while the wells are electrically insulated from each other.

14 Claims, 18 Drawing Sheets

SEMICONDUCTOR BOOSTER CIRCUIT HAVING CASCADED MOS TRANSISTORS

BACKGROUND OF THE INVENTION

1. Field of the Invention

The present invention relates to a semi-conductor booster circuit and more particularly to a semiconductor booster circuit, such as a charge pump circuit, which is used in an EEPROM (Electrically Erasable and Programmable Read Only Memory) and a flash memory.

2. Description of the Related Art

In recent years, along with the promotion of a single 5V power supply or the promotion of a single 3V power supply for semiconductor integrated circuits such as EEPROMs and flash memories, the boosting has been performed in the integrated circuit. As a result, semiconductor booster circuits such as a Cockcroft Walton circuit and a charge pump circuit have been employed.

FIG. 18 shows a configuration of a conventional semiconductor booster circuit.

As shown in the figure, N-channel MOS transistors $Q_{20}$ to $Q_{24}$ are connected in cascade to configure a booster circuit having n stages. The gate terminals of the transistors $Q_{20}$ to $Q_{24}$ are connected to e respective source terminals $N_{20}$ to $N_{24}$ to which a clock signal $\phi_A$ or $\phi_B$ is input through respective capacitors $C_{20}$ to $C_{24}$.

As shown in FIG. 19, the clock signals $\phi_A$ and $\phi_B$ are in opposite phase with each other. Each of the clock signals $\phi_A$ and $\phi_B$ has a period of 1/f and an amplitude of $V_\phi$. The clock signals $\phi_A$ and $\phi_B$ are obtained from a clock signal CK through two NAND circuits $ND_1$ and $ND_2$ and three inverters $IV_1$ to $IV_3$, and the amplitude $V_\phi$ thereof is equal to a power supply voltage Vdd. Incidentally, in FIG. 18, reference symbol G designates a ground terminal.

As shown in FIG. 18, in this semiconductor booster circuit, the power supply voltage Vdd is output as an input signal from a source terminal $N_{27}$ of a transistor $Q_{25}$, and an output voltage $V_{POUT}$ is output as an output signal from an output terminal $N_{26}$.

As described in an article "Analysis and Modeling of On-Chip High-voltage Generator Circuits for Use in EEPROM Circuits (IEEE JOURNAL OF SOLID-STATE CIRCUITS, vol. 24, No. 5, October 1989) for example, the output voltage $V_{POUT}$ of a sort of the semiconductor booster circuit is expressed by the following expressions:

$$V_{POUT}=V_{in}-V_t+n([V_\phi \cdot [C/(C+C_s)-V_t]-I_{OUT}/f(C+C_s)] \quad (1)$$

$$V_t=V_{t0}+K_2 \cdot ([Vbs+2\phi_f]^{1/2}-(2\phi_f)^{1/2}) \quad (2)$$

where $V_{in}$ is an input of the booster circuit, $V_\phi$ is an amplitude voltage of the clock signal, f is a clock frequency, C is a coupling capacitance to the clock signal, Cs is a parasitic capacitance in each of stages in the booster circuit, n is the number of stages of the booster circuit, $V_{POUT}$ is the output voltage in the final stage of the booster circuit, $I_{OUT}$ is a load current in the output stage, Vto is a threshold voltage when a substrate bias is absent, Vbs is a substrate bias voltage (a potential difference between the source and a substrate or a well), $\phi_f$ is a Fermi potential, Vt is a threshold voltage of the transistor, and $K_2$ is a substrate bias coefficient.

From the expression (1), it is understood that when the load current $I_{OUT}$ is zero and the relation of C/(C+Cs)=1 is established, the output voltage $V_{POUT}$ is increased in proportion to both a value of ($V_\phi$–Vt) and the number n of stages of the booster circuit. In the conventional booster circuit shown in FIG. 18, since the amplitude voltage $V_\phi$ of the clock signal is equal to the power supply voltage Vdd, the output voltage $V_{POUT}$ is increased in proportion to both the value of (Vdd–Vt) and the number of stages of the booster circuit.

However, in the conventional booster circuit, there occurs a phenomenon that as the level of the output voltage $V_{POUT}$ is increased, as shown in the expression (2), the threshold voltage Vt of each of the transistors $Q_{20}$ to $Q_{24}$ is increased due to the substrate effect.

Therefore, in the case where the stages of the booster circuit are discretely configured in order to prevent the substrate effect from occurring, the level of the output voltage $V_{POUT}$ is increased in proportion to the number n of stages of the booster circuit. On the other hand, in the case where the transistors $Q_{20}$ to $Q_{24}$ are integrated to be formed on the same substrate, since the substrate effect occurs, as the number n of stages of the booster circuit is increased, the value of (Vdd–Vt) is decreased.

As a result, as shown in FIG. 20, along with the increasing of the number n of stages of the booster circuit, the output voltage $V_{POUT}$ is decreased to a level lower than a value which is obtained when no substrate effect occurs, and is saturated at the point where the value of (Vdd–Vt) becomes zero. This means that no matter how the number n of stages of the booster circuit is increased, there is a limit in the resultant output voltage $V_{POUT}$. FIG. 21 shows the relationship between the power supply voltage Vdd and a maximum output voltage when the number n of stages of the booster circuit is made infinitely large. When the number n of stages of the booster circuit is made infinitely large, in the case where no substrate effect occurs, the resultant output voltage $V_{POUT}$ becomes theoretically infinite. On the other hand, in the case where the substrate effect actually occurs, the resultant output voltage $V_{POUT}$ is limited to a value depending on the power supply voltage Vdd. That is, in the conventional booster circuit; there arises a problem that in the case where the level of the power supply voltage Vdd is low, the desired output voltage $V_{POUT}$ can not be obtained even if the number n of stages of the booster circuit is set to any large value.

For example, in the conventional booster circuit shown in FIG. 18, in the case where the power supply voltage Vdd is 2.5V, and the threshold voltage Vto is 0.6V when no substrate effect occurs (the substrate bias voltage is 0V), when the number n of stages of the booster circuit is set to 20, 20V can be obtained as the output voltage $V_{POUT}$. However, in the case where the power supply voltage Vdd is 2.0V, even if the number n of stages of the booster circuit is set to 100, only 12V can be obtained as the output voltage On the other hand, in JP-A-61-254078, there is disclosed a Cockcroft type booster circuit in which a threshold voltage Vt of a MOS transistor in the subsequent stage having the substrate effect is made lower than that of a MOS transistor in the preceding stage, thereby improving the reduction of the output voltage due to the substrate effect.

However, in this configuration as well, the increase of the threshold voltage Vt due to the substrate effect can not be suppressed. For example, in the case where the level of the power supply voltage Vdd is approximately halved (Vdd=1 to 1.5V), even if the number n of stages of the booster circuit is set to any value, the desired output voltage $V_{POUT}$ can not be obtained. In addition, since the threshold voltages Vt of the MOS transistors are set to a plurality of different levels, for example, it is necessary to conduct the extra process of photomask and ion implantation. As a result, the manufacturing process becomes complicated. This is a disadvantage.

FIG. 22 shows a configuration of still another conventional semiconductor booster circuit.

As shown in FIG. 22, eight N-channel MOS transistors $M_1$ to $M_8$ are connected in series with one another to configure a booster circuit having four stages. Gate terminals of the transistors $M_1$ to $M_8$ are connected to respective drain terminals (represented by nodes $N_0$ to $N_7$). To the drain terminals $N_0$, $N_2$, $N_4$ and $N_6$, a clock signal $\phi_A$ as shown in FIG. 17 is input through capacitors $C_1$, $C_3$, $C_5$ and $C_7$, respectively. To the drain terminals $N_1$, $N_3$, $N_5$ and $N_7$, a clock signal $\phi_B$ which is in opposite phase with the clock signal $\phi_A$ is input through capacitors $C_2$, $C_4$, $C_6$ and $C_8$, respectively. In addition, substrate terminals of the transistors $M_1$ to $M_8$ are connected to a ground terminal represented by a node $N_{21}$). In addition, both a drain terminal and a gate terminal of each of the N-channel MOS transistors $M_{20}$ and $M_{21}$ are connected to an associated input terminal (represented by a node $N_{20}$), and a substrate terminal thereof is connected to the ground terminal $N_{21}$.

That is, the node $N_0$ is respectively connected to the source terminal of the transistor $M_{20}$, both the drain terminal and the gate terminal of the transistor $M_1$, and one terminal of the capacitor $C_1$. The node $N_1$ is respectively connected to the source terminal of the transistor $M_{21}$, both the drain terminal and the gate terminal of the transistor $M_2$, the source terminal of the transistor $M_1$ and one terminal of the capacitor $C_2$. The node $N_2$ is respectively connected to both the drain terminal and the gate terminal of the transistor $M_3$, the source terminal of the transistor $M_2$ and one terminal of the capacitor $C_3$. The node $N_3$ is respectively connected to both the drain terminal and the gate terminal of the transistor $M_4$, the source terminal of the transistor $M_3$ and one terminal of the capacitor $C_4$. The node $N_4$ is respectively connected to both the drain terminal and the gate terminal of the transistor $M_5$, the source terminal of the transistor $M_4$ and one terminal of the capacitor $C_5$. The node $N_5$ is respectively connected to both the drain terminal and the gate terminal of the transistor $M_6$, the source terminal of the transistor $M_5$ and one terminal of the capacitor $C_6$. The node $N_6$ is respectively connected to both the drain terminal and the gate terminal of the transistor $M_7$, the source terminal of the transistor $M_6$ and one terminal of the capacitor $C_7$. In addition, the node $N_7$ is respectively connected to both the drain terminal and the gate terminal of the transistor $M_8$, the source terminal of the transistor $M_7$ and one terminal of the capacitor $C_8$. Further, an output terminal (represented by a node $N_8$) of this semiconductor booster circuit is connected to the source terminal of the MOS transistor $M_8$.

The above-mentioned expressions (1) and (2) are also applied to this booster circuit. Then, if the load current $I_{OUT}$ is zero, the capacitance ratio $C/(C+Cs)$ is 1, and the amplitude voltage $V_\phi$ of the clock signal is equal to the power supply voltage Vdd in the expression (1), the voltage which is boosted per stage is expressed by (Vdd−Vt).

Therefore, it is understood that the output voltage $V_{POUT}$ is influenced by the margin between the threshold voltage Vt of each of the MOS transistors and the power supply voltage Vdd. In particular, it is understood that when the relation of Vt≧Vdd is established, the boosting operation is not performed in the corresponding stage. That is, if the threshold voltage Vt is increased, the voltage which is boosted per stage becomes either small or zero. Therefore, even if the number n of stages of the booster circuit is increased, the output voltage $V_{POUT}$ is hardly or never increased. For example, since the source potential of the MOS transistor shown in FIG. 22 is equal to the output voltage $V_{POUT}$, and the substrate potential is 0V, the substrate bias voltage Vbs is equal to the output voltage $V_{POUT}$. Now, since the booster circuit shown in FIG. 22 is provided for generating the positive high voltage, the output voltage $V_{POUT}$ takes one of positive values. Therefore, the threshold voltage of the MOS transistor $M_8$ becomes very high, and hence the boosting efficiency is reduced. This problem becomes especially pronounced during the low power source voltage operation in which the margin between the threshold voltage Vt and the power supply voltage Vdd is small.

In this booster circuit, as shown in FIG. 22, all the substrate terminals of the MOS transistors $M_1$ to $M_8$ are grounded. That is, the MOS transistors $M_1$ to $M_8$ are, as shown in FIG. 23, respectively constituted by sources/drains 454 to 462, which are formed in a P type semiconductor substrate 451, and gates 464 to 471, and the substrate terminal is connected to a ground terminal $N_{21}$ through a P$^+$ type impurity diffusion layer 452 in the semiconductor substrate 451. Incidentally, reference numeral 453 designates a drain of a MOS transistor 20 and reference numeral 463 designates a gate of the MOS transistor 20.

Therefore, there arises a problem that the potential of the source terminal of the MOS transistor, which is located in the more backward stage, becomes higher, and the difference in the potential between the source terminal and the substrate portion is increased so that due to the so-called substrate bias effect, the threshold voltage Vt is increased, and hence the output voltage $V_{POUT}$ is limited due to the increase of the threshold voltage Vt.

SUMMARY OF THE INVENTION

It is therefore an object of the present invention to provide a semiconductor booster circuit in which a desired output voltage is capable of being obtained, even in the case where a level of a power supply voltage is low, without the necessity of the complicated manufacturing process.

A semiconductor booster circuit, according to the present invention, includes: a plurality of stages, each having a first MOS transistor and a first capacitor having one terminal connected to a drain terminal of the first MOS transistor, the stages being connected in series by connecting the first MOS transistors of the stages in cascade; and at least one of a first arrangement wherein a source terminal and a substrate of the first MOS transistor of each of the stages are electrically connected to each other and when the plurality of stages are divided into at least two groups, the substrates of the first MOS transistor included in each group are electrically insulated from the substrates of the first MOS transistors included in a different group and an arrangement wherein one terminal of a second capacitor is connected to a gate terminal of the first MOS transistor of each of the stages, and first clock signal generating means for inputting a first clock signal to the other terminal of the first capacitor, and second clock signal generating means for inputting a second clock signal having a larger amplitude than a power supply voltage to the other terminal of the second capacitor are provided.

The semiconductor booster circuit, according to a first aspect of the present invention, includes a plurality of stages, each having a first MOS transistor and a first capacitor having one terminal connected to a drain terminal of the MOS transistor, the stages being connected in series by connecting the MOS transistors of the stages in cascade wherein a source terminal and a substrate of the first MOS transistor of each of the stages are electrically connected to each other and when the plurality of stages are divided into at least two groups, the substrates of the first MOS transistors included in each group are electrically insulated from the substrates of the first MOS transistors included in a different group.

In one embodiment of the present invention, the first MOS transistor is a P-channel MOS transistor which is formed in an N type well region, and the N type well regions of the respective stages are electrically insulated from one another.

In one embodiment of the present invention, in each of the stages, a second capacitor having one terminal, which is connected to a gate terminal of the first MOS transistor, is provided, and also the gate terminal and the source terminal of the first MOS transistor are connected to each other through a second MOS transistor, and a gate terminal of the second MOS transistor is connected to the one terminal of the first capacitor.

In one embodiment of the present invention, a pair of first clock signals which are in opposite phase with each other are respectively inputted to the two other terminals of the first capacitors in the two continuous stages, and a pair of second clock signals which are different in pulse timing from each other are respectively inputted to the two other terminals of the second capacitors in the two continuous stages.

In one embodiment of the present invention, in each of the stages, the gate terminal of the first MOS transistor in the preceding stage is connected to the one terminal of the first capacitor in the subsequent stage, and a pair of clock signals which are in opposite phase with each other are respectively inputted to the two other terminals of the first capacitors in the two continuous stages.

In one embodiment of the present invention, each of the stages includes a first MOS transistor and a first capacitor having one terminal connected to a source terminal of the first MOS transistor, wherein the stages are connected in series by connecting the first MOS transistors of the respective stages in cascade, a gate terminal and the source terminal of the first MOS transistor in each stage are electrically connected to each other, and also the source terminal and the substrate thereof are electrically connected to each other and the substrate is electrically insulated from the substrate of the first MOS transistors in another stage.

Incidentally, in a preferred aspect of the present invention, the first MOS transistor is an N-channel MOS transistor which is formed in a P type well region, and the P type well regions of the respective stages are electrically insulated from one another.

In the first aspect of the present invention, the substrate of the MOS transistor forming each of the stages of the booster circuit is electrically insulated from the substrate of the MOS transistor of another stage, and in each of the stages, the substrate and the source terminal of the MOS transistor are electrically connected to each other, whereby the potential at the substrate of the MOS transistor is fixed to the source potential. Hence the increase of the threshold voltage of the MOS transistor due to the substrate effect is effectively suppressed.

A semiconductor booster circuit, according to a second aspect of the present invention, includes: a plurality of stages, each having a first MOS transistor, a first capacitor having one terminal connected to a drain terminal of the first MOS transistor, and a second capacitor having one terminal connected to a gate terminal of the first MOS transistor, the stages being connected in series by connecting the first MOS transistors in the respective stages in cascade; first clock signal generating means for inputting a first clock signal to the other terminal of the first capacitor and second clock signal generating means for inputting a second clock signal having a larger amplitude than a power supply voltage to the other terminal of the second capacitor.

In one embodiment of the present invention, the first clock signal includes a pair of clock signals which are in opposite phase with each other, and the pair of clock signals are respectively inputted to the two first capacitors in the two consecutive stages.

In one embodiment of the present invention, in each of the stages, the gate terminal and the drain terminal of the first MOS transistor are connected to each other through a second MOS transistor, and a gate terminal of the second MOS transistor is connected to the other terminal of the first capacitor in the subsequent stage.

In the second aspect of the present invention, in order to drive the MOS transistors to perform the boosting operation, other clock signals are employed which are different from the clock signals which are used to drive the stages and have a larger amplitude than the power supply voltage, whereby it is possible to secure the threshold for conducting the MOS transistor and also it is possible to prevent the reduction of the output voltage due to the substrate effect.

A semiconductor booster circuit, according to a third aspect of the present invention, includes: a plurality of stages, each having a first MOS transistor and a first capacitor having one terminal connected to a drain terminal of the first MOS transistor, the stages being connected in series by connecting the first MOS transistors of the respective stages in cascade, wherein a source terminal and a substrate of the first MOS transistor in each of the stages are electrically connected to each other, and when the plurality of stages are divided into at least two stages, the substrates of the first MOS transistors included in each group are electrically insulated from the substrates of the first MOS transistors included in another group; and wherein one terminal of a second capacitor is connected to a gate terminal of the first MOS transistor in each of the stages, and first clock signal generating means for inputting a first clock signal to the other terminal of the first capacitor in each stage, and second clock signal generating means for inputting a second clock signal having a larger amplitude than a power supply voltage to the other terminal of the second capacitor in each stage are provided.

In one embodiment of the present invention, the first MOS transistor is a P-channel MOS transistor which is formed in an N type well region, and the N type well regions in the respective stages are electrically insulated from one another.

In one embodiment of the present invention, in each of the stages, the gate terminal and the source terminal of the first MOS transistor are electrically connected to each other through a second MOS transistor, and a gate terminal of the second MOS transistor is connected to the one terminal of the first capacitor.

In one embodiment of the present invention, the first clock signal includes a pair of clock signals which are in opposite phase with each other, and the pair of clock signals are respectively inputted to the first capacitors in the two consecutive stages.

In the third aspect of the present invention, the substrate of the MOS transistor constituting each of the stages of the booster circuit is electrically insulated from the substrate of the MOS transistor in another stage, and also in each of the stages, the substrate and the source terminal of the MOS transistor are electrically connected to each other, whereby the potential at the substrate of the MOS transistor is fixed to the source potential. Hence the increase of the threshold voltage of the MOS transistor due to the substrate effect is suppressed.

In addition, the gate voltage of the MOS transistor which operates to perform the boosting operation in the stages is controlled by the clock signals other than the source voltage and the drain voltage, and the amplitude of each of the clock signals is made larger than the input power supply voltage of the booster circuit, whereby since even in the employment of the low power supply voltage, the MOS transistor can be sufficiently rendered to an on state, and also the voltage drop due to the threshold voltage of the MOS transistor is eliminated so that the boosting capability is improved.

A semiconductor booster circuit, according to a fourth aspect of the present invention, includes a plurality of stages, each of the stages having two first MOS transistors which are connected in series with each other and two capacitors, each having one terminal connected to a drain or source terminal of one of the first MOS transistors, the series circuits of the first MOS transistors of the respective stages being connected in series between an input side and an output side, wherein the plurality of stages are divided into at least two groups, and substrates of the first MOS transistors included in the stages of each group are formed integrally in a conductive substrate portion, and the potentials which are applied to the substrate portions of the groups are controlled independently of one another.

In one embodiment of the present invention, the booster circuit operates for generating a positive high voltage and the substrate portions of the first MOS transistors included in the more backward stage are controlled at a higher potential.

In one embodiment of the present invention, the first MOS transistor is a P-channel MOS transistor which is formed in an N type well region, and the N type well regions of the respective groups are electrically insulated from one another.

In one embodiment of the present invention, the booster circuit operates for generating a negative high voltage and the substrate portions of the first MOS transistors included in the more backward stage are controlled at a negative lower potential.

In one embodiment of the present invention, the first MOS transistor is an N-channel MOS transistor which is formed in a P type well region, and the P type well regions of the respective groups are electrically insulated from one another.

In one embodiment of the present invention, the substrate of the first MOS transistor of each stage is connected to a drain terminal or a source terminal of the first MOS transistor which is located at the preceding stage of the group to which the first MOS transistor belongs.

In one embodiment of the present invention, second capacitors each having one terminal connected to the gate terminal of one of the first MOS transistors are provided, and the gate terminal and the source or drain terminal of each of the first MOS transistors are connected to each other through a second MOS transistor, and the gate terminal of the second MOS transistor is connected to the one terminal of the first capacitor.

In one embodiment of the present invention, in each of the stages, the substrate of the second MOS transistor is connected to the substrate of the first MOS transistor.

In one embodiment of the present invention, a pair of first clock signals which are in opposite phase with each other are respectively inputted to the other terminals of the two adjacent first capacitors, and also a pair of second clock signals which are different in pulse timing from each other are respectively inputted to the other terminals of the two adjacent second capacitors.

In the fourth aspect of the present invention, since the substrate portions of the MOS transistors constituting the booster circuit are divided into groups and the potentials of the substrate portions in the respective groups are controlled independently of one another, the potentials at the substrate portions of the MOS transistors of each group can be fixed to a potential different from that of another group. Therefore, it is possible to suppress the increase of the threshold voltage of the MOS transistor due to the substrate bias effect, and also the level of the output voltage can be made higher than that in the conventional booster circuit.

DESCRIPTION OF THE PREFERRED EMBODIMENTS

A first embodiment of the present invention will hereinafter be described in detail with reference to FIGS. 1 to 10.

Figure 1:
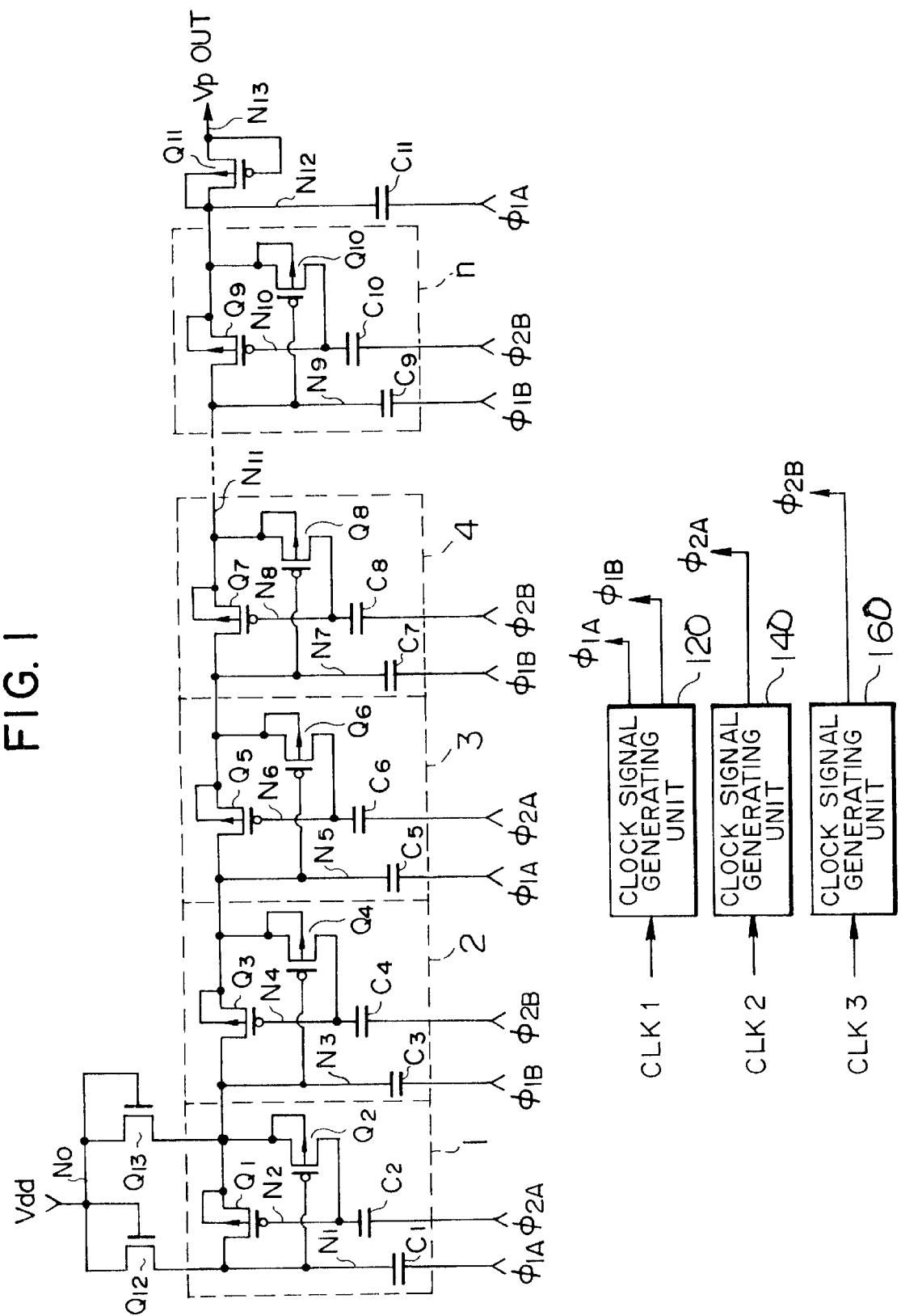
FIG. 1 is a circuit diagram showing a configuration of a semiconductor booster circuit according to a first embodiment of the present invention.

FIG. 1 shows a configuration of a semiconductor booster circuit according to the first embodiment of the present invention.

As shown in FIG. 1, n elements of P-channel MOS transistors $Q_1, Q_3, Q_5, Q_7, \ldots, Q_9$ are connected in cascade to configure a booster circuit having n stages. Substrate portions of the transistors $Q_1, Q_3, Q_5, Q_7, \ldots, Q_9$ are electrically insulated from one another and also are connected to source terminals of the transistors $Q_1, Q_3, Q_5, Q_7, \ldots, Q_9$, respectively. In addition, to drain terminals (represented by nodes $N_1, N_3, N_5, N_7, \ldots, N_9$) a clock signal $\phi_{1A}$ or $\phi_{1B}$ which is shown in FIG. 3 is inputted through respective capacitors $C_1, C_3, C_5, C_7, \ldots, C_9$.

Figure 3:
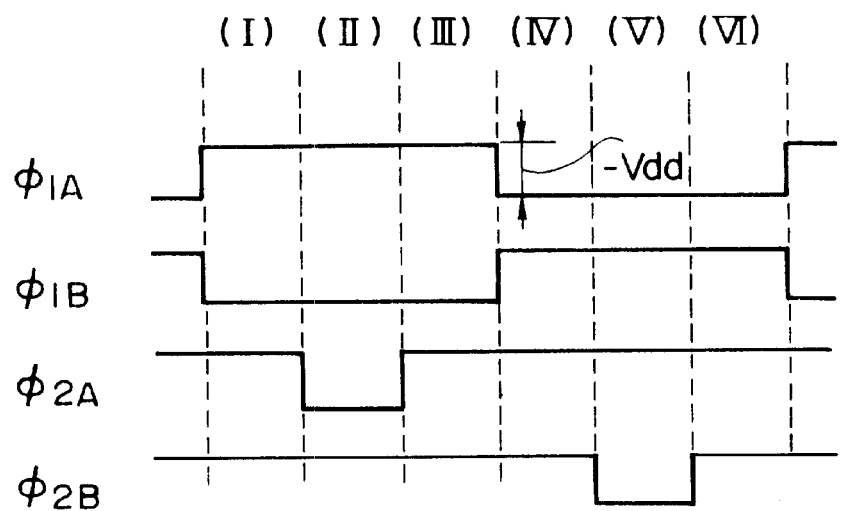
FIG. 3 is a timing chart showing the timing of clock pulses used in the semiconductor booster circuit shown in FIG. 1.

In addition, to gate terminals (represented by nodes $N_2, N_4, N_6, N_8, \ldots, N_{10}$) of the transistors $Q_1, Q_3, Q_5, Q_7, \ldots, Q_9$, a clock signal $\phi_{2A}$ or $\phi_{2B}$ which is shown in FIG. 3 is inputted through respective capacitors $C_2, C_4, C_6, C_8, \ldots, C_{10}$.

Further, P-channel MOS transistors $Q_2, Q_4, Q_6, Q_8, \ldots, Q_{10}$ are respectively connected between the gate terminals $N_2, N_4, N_6, N_8, \ldots, N_{10}$ and source terminals (represented by nodes $N_3, N_5, N_7, N_{11}, \ldots, N_{12}$) of the transistors $Q_1, Q_3, Q_5, Q_7, \ldots, Q_9$, and gate terminals of the transistors $Q_2, Q_4, Q_6, Q_8, \ldots, Q_{10}$ are respectively connected to the drain terminals $N_1, N_3, N_5, N_7, N_9$ of the transistors $Q_1, Q_3, Q_5, Q_7, \ldots, Q_9$.

In the booster circuit of the present embodiment, a power supply voltage Vdd is inputted as an input signal from a common source terminal (represented by a node $N_0$) of N-channel MOS transistors $Q_{12}$ and $Q_{13}$ to the source terminals $N_1$ and $N_3$ of the transistors $Q_1$ and $Q_3$, and an output voltage $V_{POUT}$ is outputted as an output signal from an output terminal (represented by a node $N_{13}$) through an N-channel MOS transistor $Q_{11}$. As shown in the figure, the gate terminals of the transistors $Q_{12}$ and $Q_{13}$ are respectively connected to the source terminal $N_0$. In addition, to a source terminal (represented by a node $N_{12}$) of the transistor $Q_{11}$, the clock signal $\phi_{1A}$ which is shown in FIG. 3 is inputted through a capacitor $C_{11}$. Further, a gate terminal of the transistor $Q_{11}$ is connected to a drain terminal (represented by the node $N_{13}$).

As shown in FIG. 3, the clock signals $\phi_{1A}$ and $\phi_{1B}$ are in opposite phase with each other and have the same amplitude as the power supply voltage Vdd, and the clock signals $\phi_{2A}$ and $\phi_{2B}$ are pulse-like signals which have the amplitude equal to or larger than the power supply voltage Vdd and are in an off-state at periods when the clock signals $\phi_{1A}$ and $\phi_{1B}$ are in an on-state, respectively.

As for a clock signal generating unit 120 which operates to generate the clock signals $\phi_{1A}$ and $\phi_{1B}$ the same as the conventional unit may be employed. As for clock signal generating units 140 and 160 which operate to generate the clock signals $\phi_{2A}$ and $\phi_{2B}$ respectively, any units may be employed which operate to receive clock pulse signals $CLK_2$ and $CLK_3$ of the same timings as those of the generating timings of the clock signals $\phi_{2A}$ and $\phi_{2B}$, respectively, and control the amplitudes thereof.

Next, the description will hereinbelow be given with respect to the operation of the semiconductor booster circuit according to the first embodiment with reference to FIGS. 2 to 5.

Figure 2:
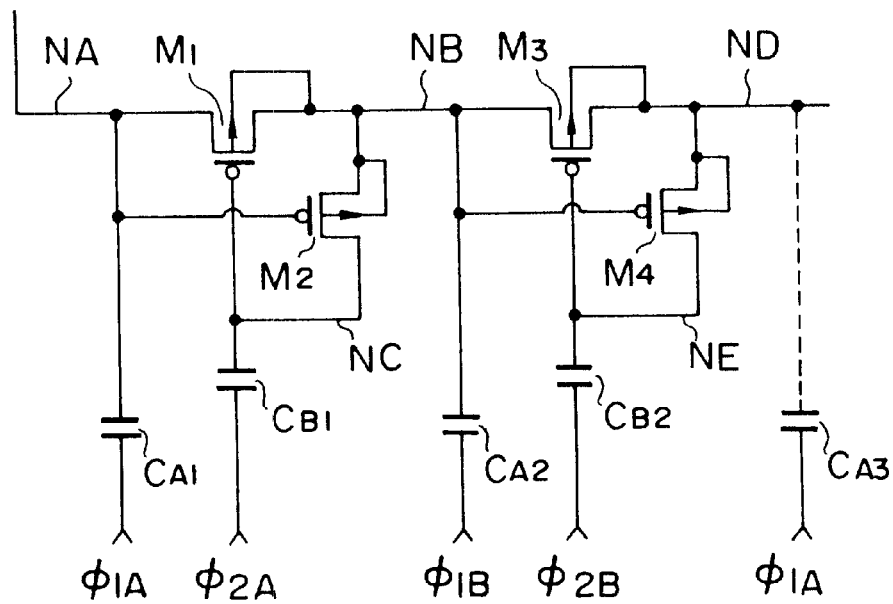
FIG. 2 is a circuit diagram showing a configuration of the two continuous stages of the semiconductor booster circuit according to the first embodiment shown in FIG. 1.

FIG. 2 is a circuit diagram showing a configuration of two consecutive stages (a first stage and a second stage) of the semiconductor booster circuit shown in FIG. 1. In addition, FIGS. 4A to 4D show waveforms of the voltages at nodes $N_A$ to $N_D$ of the circuit of FIG. 2 for a time period ranging from (I) to (VI) shown in FIG. 3. Further, FIGS. 5A to 5F are respectively circuit diagrams useful in explaining the conduction state of transistors $M_1$ to $M_4$ of FIG. 2 for a time period ranging from (I) to (VI).

Figure 4A:
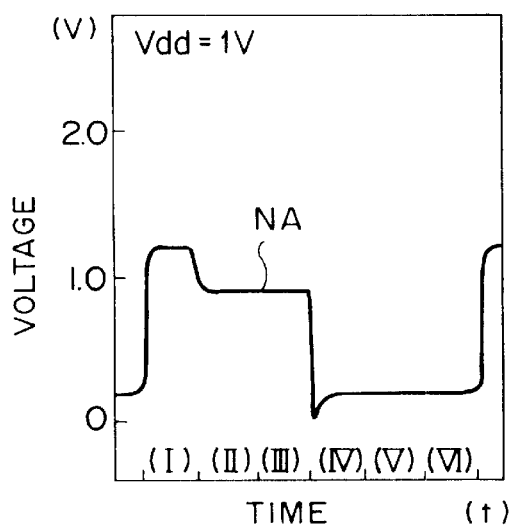
FIGS. 4A to 4D are respectively graphical representations showing waveforms of voltages at respective nodes of the semiconductor booster circuit shown in FIG. 1.

Firstly, for a period of time of (I), as shown in FIG. 3, the level of the clock signal $\phi_{1A}$ is raised from the ground potential up to the power supply voltage Vdd, and also the potential at the drain terminal $N_A$ of the transistor $M_1$ shown in FIG. 2 is, as shown in FIG. 4A, raised by a voltage corresponding to the power supply voltage Vdd.

Figure 4B:
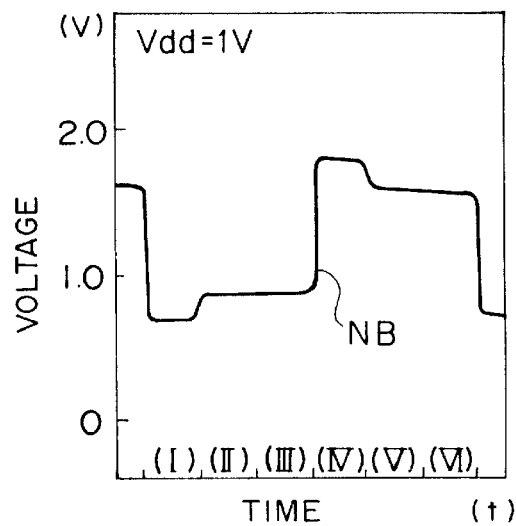

At the same time, the level of the clock signal $\phi_{1B}$ is dropped from the power supply voltage Vdd down to the ground potential 0V, and also the potential at the source terminal $N_B$ of the transistor $M_1$ is, as shown in FIG. 4B, dropped by a voltage corresponding to the power supply voltage Vdd.

At this time, the electric charges which have been transferred from the preceding stage are accumulated in the capacitor $C_{A2}$ which is connected to the source terminal $N_B$ of the transistor $M_1$, and hence the potential at the source terminal $N_B$ of the transistor $M_1$ is raised by a voltage corresponding to the electric charges accumulated in that capacitor $C_{A2}$.

Figure 5A:
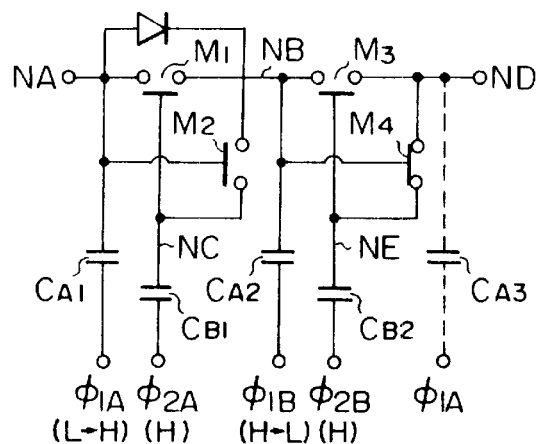
FIGS. 5A to 5F are respectively circuit diagrams useful in explaining the operation of the semiconductor booster circuit shown in FIG. 1.

In addition, the potential at the gate terminal $N_A$ of the transistor $M_2$ becomes higher than that at the source terminal $N_B$, and hence the transistor $M_2$ is, as shown in FIG. 5A, switched from the on state to the off state.

At this time, as will be described later, since the $P_N$ junction which is formed between the drain terminal $N_A$ and the source terminal $N_B$ of the transistor $M_1$ is biased in the forward direction, the substrate portion of the transistor $M_1$ which is connected to the source terminal $N_B$ is maintained at the potential which is obtained by subtracting the forward bias voltage across the $P_N$ junction from the potential at the drain terminal $N_A$.

Figure 4C:
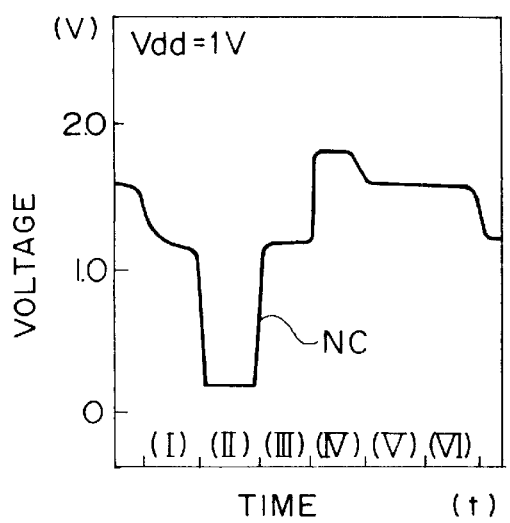

In addition, as shown in FIG. 4C, the potential at the gate terminal $N_C$ of the transistor $M_1$ is dropped down to the same potential as that at the drain terminal $N_A$, but the transistor $M_1$ remains, as shown in FIG. 5A, in the off state.

Figure 4D:
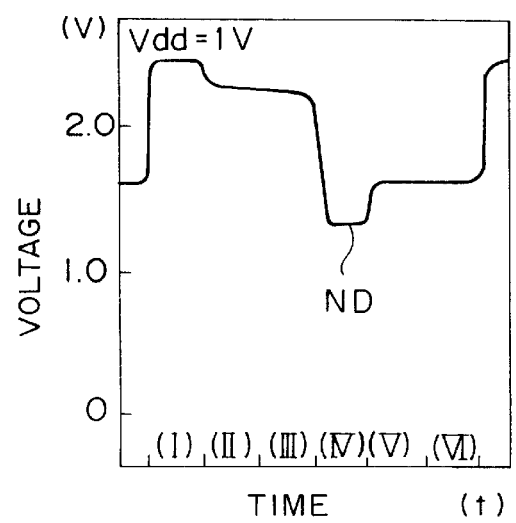

As the level of the clock signal $\phi_{1A}$ is raised from the ground potential 0V up to the power supply voltage Vdd, the potential at the source terminal $N_D$ of the transistor $M_3$ is, as shown in FIG. 4D, raised by a voltage corresponding to the power supply voltage Vdd.

At this time, the electric charges which have been transferred from the preceding stage are accumulated in the capacitor $C_{A3}$, and hence the potential at the source terminal ND of the transistor $M_3$ is raised by a voltage corresponding to the electric charges accumulated in the capacitor $C_{A3}$.

In addition, at the time when the level of the clock signal $\phi_{1B}$ has been dropped from the power supply voltage Vdd down to the ground potential 0V, the potential at the gate terminal $N_B$ of the transistor $M_4$ is dropped and hence the transistor $M_4$ is switched from the off state to the on state. Therefore, the potential at the gate terminal $N_E$ of the transistor $M_3$ becomes the same potential as that at the source terminal $N_D$ of the transistor $M_3$. At this time, as shown in FIG. 5A, the transistor $M_3$ remains in the off state.

Next, for a period of time (II), the level of the clock signal $\phi_{2A}$ is dropped from the power supply voltage Vdd down to the ground potential 0V, and hence the potential at the gate terminal $N_C$ of the transistor $M_1$ is, as shown in FIG. 4C, dropped by a voltage corresponding to the power supply voltage Vdd.

Figure 5B:
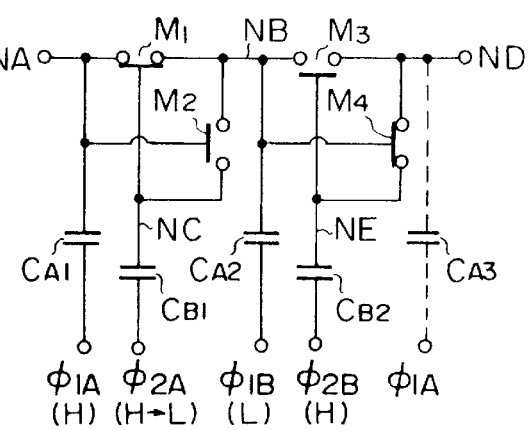

As a result, as shown in FIG. 5B, the transistor $M_1$ is turned on and hence a current is caused to flow from the drain terminal $N_A$ to the source terminal $N_B$ of the transistor $M_1$ until the potential at the drain terminal $N_A$ becomes equal to that at the source terminal $N_B$.

That is, the electric charges are transferred from the capacitor $C_{A1}$ to the capacitor $C_{A2}$, and hence the potential at the drain terminal $N_A$ of the transistor $M_1$ is, as shown in FIG. 4A, dropped, and also the potential at the source terminal $N_B$ of the transistor $M_1$ is, as shown in FIG. 4B, raised.

In addition, with respect to the source terminal $N_D$ of the transistor $M_3$ as well, in the same manner as that in the case of the drain terminal $N_A$ of the transistor $M_1$, as shown in FIG. 4D, the potential at the source terminal $N_D$ is dropped.

At this time, the clock signal $\phi_{2A}$ which is used to turn the transistor $M_1$ on is supplied from the outside through the capacitor $C_{B1}$, and no voltage drop occurs between the drain terminal $N_A$ and the source terminal $N_B$ when turning the transistor $M_1$ on. Therefore, as compared with the prior art, the boosting capability is further improved. That is, in the above-mentioned expression (1), this state corresponds to the situation in which in the term within the brackets, Vt is equal to 0V. Thus, the boosting operation can be performed with an exceptionally good efficiency.

Next, for a period of time (III), the level of the clock signal $\phi_{2A}$ is raised from the ground potential 0V up to the power supply voltage Vdd, and hence the potential at the gate terminal $N_C$ of the transistor $M_1$ is, as shown in FIG. 4C, raised by a voltage corresponding to the power supply voltage Vdd.

Figure 5C:
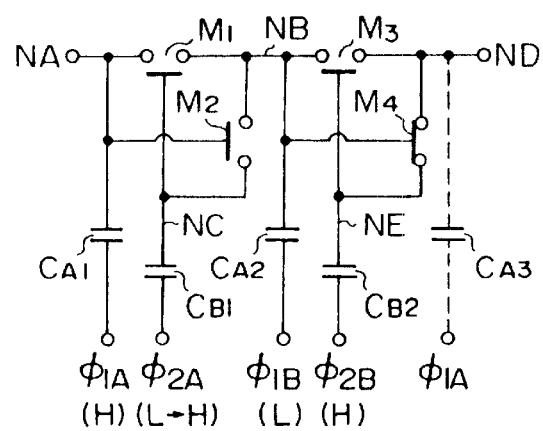

As a result, as shown in FIG. 5C, the transistor $M_1$ is turned off.

In addition, as shown in FIGS. 4A, 4B and 4D, the potentials at the drain terminal $N_A$ and the source transistor $N_B$ of the transistor $M_1$, and the potential at the source terminal $N_D$ of the transistor $M_3$ do not change.

Next, for a period of time (IV), the level of the clock signal $\phi_{1A}$ is dropped from the power supply voltage Vdd down to the ground potential 0V, and hence the potential at the drain terminal $N_A$ of the transistor $M_1$ is forced to drop by a voltage corresponding to the power supply voltage Vdd. However, in the first stage, since the transistor $Q_{12}$ shown in FIG. 1 goes to the on state, as shown in FIG. 4A, the potential at the drain terminal $N_A$ of the transistor $M_1$ goes to the potential of (Vdd−Vt).

In addition, the level of the clock signal $\phi_{1B}$ is raised from the ground potential 0V up to the power supply voltage Vdd, and hence the potential at the source terminal $N_B$ of the transistor $M_1$ is, as shown in FIG. 4B, raised by a voltage corresponding to the power supply voltage Vdd.

At this time, since the electric charges which have been transferred from the preceding stage are accumulated in the capacitor $C_{A2}$, the potential at the source terminal $N_B$ of the transistor $M_1$ is raised by a voltage corresponding to the electric charges accumulated in the capacitor $C_{A2}$.

Figure 5D:
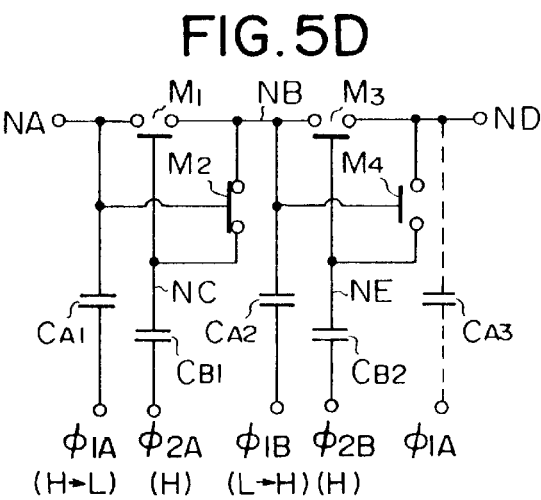

In addition, the potential at the gate terminal $N_A$ of the transistor $M_2$ becomes lower than that at the source terminal $N_B$ thereof, and hence the transistor $M_2$ is, as shown in FIG. 5D, switched from the off state to the on state.

As a result, the potential at the gate terminal $N_C$ of the transistor $M_1$ is, as shown in FIG. 4C, raised up to the same potential as that at the source terminal $N_B$ of the transistor $M_1$.

In addition, as the level of the clock signal $\phi_{1A}$ is dropped from the power supply voltage down to the ground potential 0V, the potential at the source terminal $N_D$ of the transistor $M_3$ is, as shown in FIG. 4D, dropped by a voltage corresponding to the power supply voltage Vdd.

At this time, the electric charges which have been transferred from the preceding stage are accumulated in the capacitor $C_{A3}$, and hence the potential at the source terminal $N_D$ is raised by a voltage corresponding to the electric charges accumulated in the capacitor $C_{A3}$.

As a result, the potential at the drain terminal $N_E$ of the transistor $M_4$ becomes higher than that at the source terminal $N_D$ thereof, and hence the transistor $M_4$ is, as shown in FIG. 5D, switched from the on state to the off state.

In addition, in the same manner as that in the case of the above-mentioned transistor $M_1$, since the PN junction which is formed between the drain terminal $N_B$ and the source terminal $N_D$ of the transistor $M_3$ is biased in the forward direction, the substrate portion of the transistor $M_3$ connected to the source terminal $N_D$ is maintained at a voltage which is obtained by subtracting the forward bias voltage across the PN junction from the potential at the drain terminal $N_B$.

Next, for a period of time of (V), the level of the clock signal $\phi_{2B}$ dropped from the power supply voltage Vdd down to the ground potential 0V, and hence the potential at the gate terminal $N_E$ of the transistor $M_3$ is dropped by a voltage corresponding to the power supply voltage Vdd.

Figure 5E:
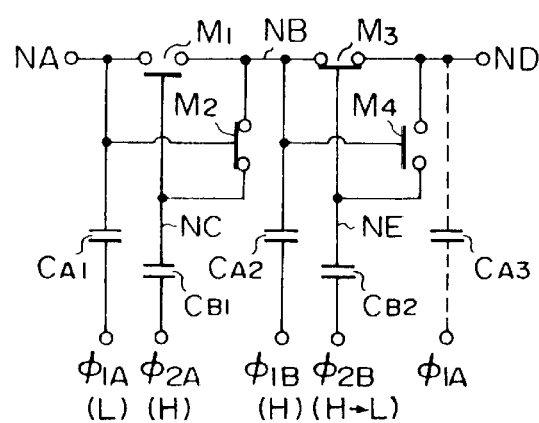

As a result, as shown in FIG. 5E, the transistor $M_3$ is turned on, and also a current is caused to flow from the drain terminal $N_B$ to the source terminal $N_D$ of the transistor $M_3$ until the potential at the drain terminal $N_B$ becomes equal to that at the source terminal $N_D$.

That is, the electric charges are transferred from the capacitor $C_{A2}$ to the capacitor $C_{A3}$, and hence as shown in FIG. 4B, the potential at the drain terminal $N_B$ of the transistor $M_3$ is dropped and also as shown in FIG. 4D, the potential at the source terminal $N_D$ of the transistor $M_3$ is raised.

In addition, since the transistor $M_2$ remains in the on state, and the potential at the gate terminal $N_C$ of the transistor $M_1$ is equal to that at the drain terminal $N_B$ of the transistor $M_3$, as shown in FIG. 4C, the potential at the gate terminal $N_C$ of the transistor $M_1$ is dropped.

At this time, the clock signal $\phi_{2B}$ which is used to turn the transistor $M_3$ on is supplied from the outside through the capacitor $C_{B2}$, and no voltage drop occurs between the drain terminal $N_B$ and the source terminal $N_D$ when turning the transistor $M_3$ on. Therefore, as compared with the prior art, the boosting capability is further improved.

Next, for a period of time of (VI), the level of the clock signal $\phi_{2B}$ is raised from the ground potential 0V up to the power supply voltage Vdd, and hence the potential at the gate terminal $N_E$ of the transistor $M_3$ is raised by a voltage corresponding to the power supply voltage Vdd.

Figure 5F:
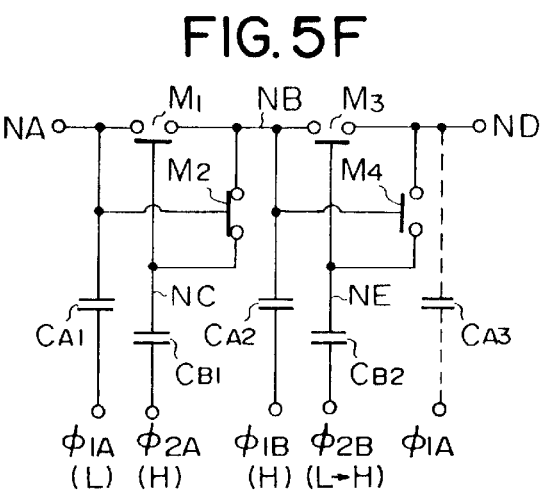

As a result, as shown in FIG. 5F, the transistor $M_3$ goes to the off state.

In addition, as shown in FIGS. 4A to 4D, the potentials at the nodes $N_A$ to $N_D$ do not change.

In the operation of prior art as described above, since the source terminals of the transistors $M_1$ to $M_3$ are boosted such that the source terminal of the transistor located in the subsequent stage becomes higher, the substrate effect acts inherently to raise, as shown in the above-mentioned expression (2), the threshold voltage Vt of each of the transistors $M_1$ and $M_3$. However, in the present embodiment, as shown in FIG. 2, since the substrate portions of the transistors $M_1$ and $M_3$ are connected to the source terminal, no substrate effect occurs, and hence the transfer of the electric charges from the preceding stage to the subsequent stage is effectively performed.

Figure 6:
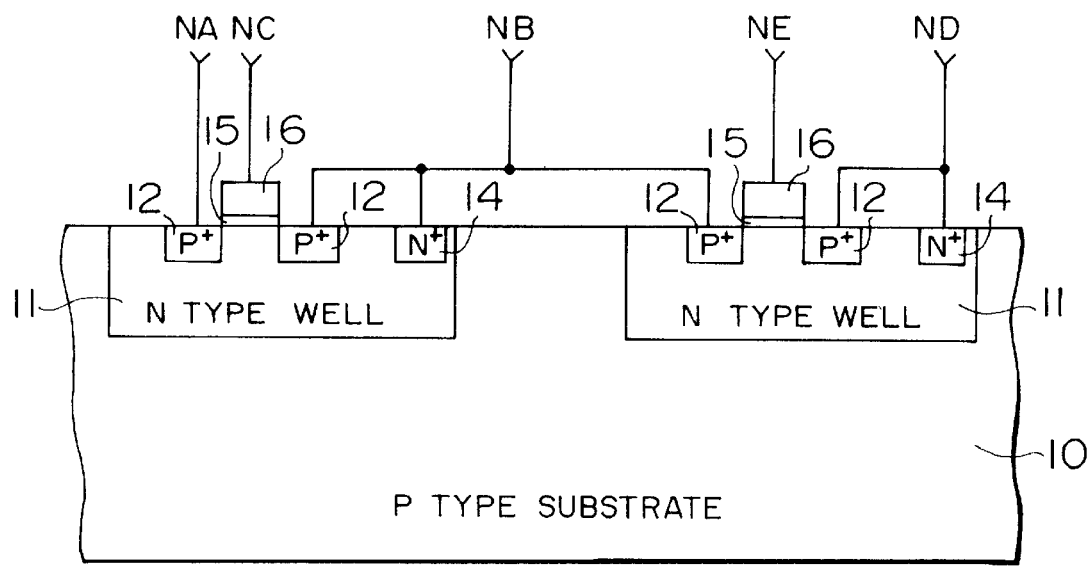
FIG. 6 is a cross sectional view showing a device structure of the semiconductor booster circuit shown in FIG. 1.

FIG. 6 is a schematic cross sectional view showing a device structure of the transistors $M_1$ and $M_3$ shown in FIG. 2.

As shown in FIG. 6, two N type well regions 11 are respectively formed in a P type semiconductor substrate 10 so as to be insulated from each other, and in each of the N type well regions 11, there is formed a MOS transistor which includes a polycrystalline silicon layer 16, as a gate electrode, which is formed on the substrate portion of the well 11 with a gate oxide film disposed therebetween, and P+ type impurity diffusion layers 12 as source/drain regions.

The P+ type impurity diffusion layer 12 of the source side in each of the transistors is electrically connected to the N type well region 11, in which the transistor is formed, through a N+ type impurity diffusion layer 14, and the source of the transistor in the preceding stage is connected to the drain of the transistor in the subsequent stage.

By adopting this structure, the potential at the N type well region 11 as the substrate portion of each of the transistors is fixed to the source potential of each of the transistors, and hence the substrate effect can be effectively prevented from occurring.

In addition, for a period of time of (I) of FIG. 5A or (IV) of FIG. 5D, the PN junction which is formed between the P+ type impurity diffusion layer 12 of the drain side and the N type well region 11 of each of the transistors is biased in the forward direction. Then, through that PN junction, the electric charges can be transferred from the node $N_A$ to the node $N_B$ and from the node $N_B$ to the node $N_D$ through the N type well region 11 of the substrate and the N+ type impurity diffusion layer 14. In this case, the voltage difference corresponding to the forward bias voltage $V_F$ (normally, about 0.7V) across the PN junction which is independent of the threshold voltage Vt of the MOS transistor is utilized for the boosting operation, and hence $V_F$ is employed instead of Vt in the above-mentioned expressions (1) and (2). Since the forward bias voltage $V_F$ across the PN junction is not influenced by the substrate effect, it is possible to realize the booster circuit which, even when the number of stages of the booster circuit is increased, is free from the reduction of the boosting capability due to the substrate effect.

As described above, in the semiconductor booster circuit according to the first embodiment of the present invention, the substrate portions of the MOS transistors $Q_1$, $Q_3$, $Q_5$, $Q_7$, . . . , $Q_9$ shown in FIG. 1 are electrically insulated from one another, and also the substrate portions are respectively connected to the source terminals $N_3$, $N_5$, $N_7$, $N_{11}$, . . . , $N_{12}$, whereby the increase of the threshold voltage Vt due to the substrate effect is effectively prevented. Therefore, it is possible to obtain the output voltage $V_{POUT}$ which is increased in proportion to the number n of stages of the booster circuit and also it is possible to provide the semiconductor booster circuit which has the higher boosting capability than that of the prior art.

In addition, with respect to the structure of the present embodiment, as shown in FIG. 6, the N type well regions 11 in which the respective transistors are formed are isolated from each other and also the N+ type impurity region 14 of each of the N type well regions 11 is electrically connected to the P+ type impurity region 12 of the source side of each of the transistors. Thus, the process for making the threshold voltages of the respective transistors different from one another, as in the prior art, is not required at all. Therefore, the number of manufacturing processes is not increased much.

In addition, the substrate portion of each transistor is electrically connected to the source terminal, whereby the PN junction which is formed in the boundary between the drain and the substrate portion is connected in parallel between the source and drain of the transistor. Then, when transferring the electric charges from the preceding stage to the subsequent stage in the booster circuit, the PN junction is biased to the on state, whereby the potential at the substrate portion of each transistor can be fixed to a voltage difference corresponding to the forward bias voltage $V_F$ (normally, about 0.7V) across the PN junction. Thus, it is possible to suppress the influence of the substrate effect.

In addition, as shown in FIG. 5, to the gate terminals $N_C$ and $N_E$ of the transistors $M_1$ and $M_3$, the pair of clock signals $\phi_{2A}$ and $\phi_{2B}$ which are independent from the pair of clock signals $\phi_{1A}$ and $\phi_{1B}$ respectively inputted to the drain terminals $N_A$ and $N_B$, are respectively inputted, whereby each of the transistors $M_1$ and $M_3$ can be turned on in such a way that no potential difference occurs between the source and the drain thereof. Therefore, when transferring the electric charges from the preceding stage to the subsequent stage in the booster circuit, it is possible to realize the transfer of the electric charges such that the voltage drop does not occur which corresponds to the potential difference between the source and the drain. Therefore, since in the above-mentioned expression (1), the threshold voltage Vt can be regarded as zero, the boosting operation can be more efficiently performed as compared with the conventional booster circuit. Even the case where the number n of stages of the booster circuit and the power supply voltage Vdd are the same as those of the conventional booster circuit, the larger output voltage $V_{POUT}$ can be obtained. In addition, in the case where the output voltage $V_{POUT}$ is the same as that of the conventional booster circuit, the booster circuit of the present embodiment can obtain the larger load current $I_{OUT}$.

For example, in the case where the power supply voltage Vdd is 20V, and the number n of stages of the booster circuit is 20, assuming that the capacitance ratio C/(C+Cs) is 0.9, the absolute value of the threshold voltage |Vt| is 0.6, and the load current $I_{OUT}$ of the output stage is zero, only 20V can be obtained as the output voltage $V_{POUT}$ in the conventional booster circuit, but in the booster circuit according to the present embodiment, about 47V can be obtained.

Figure 21:
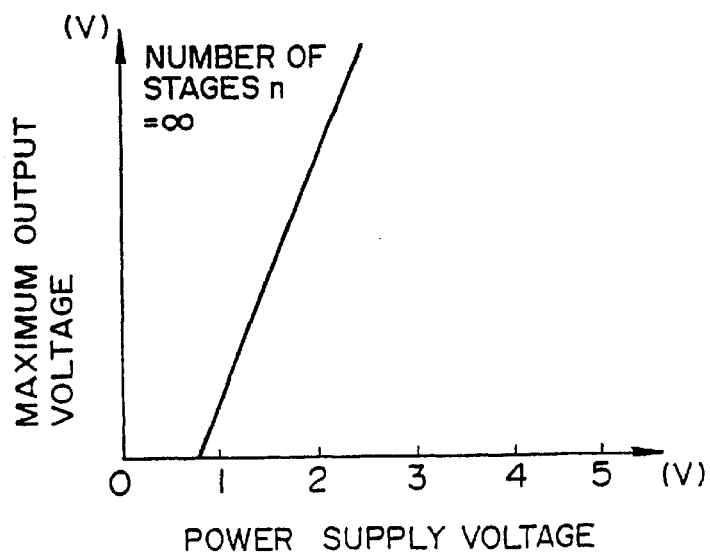
FIG. 21 is a graphical representation showing the relationship between a power supply voltage and a maximum output voltage when the number of stages of the conventional prior art semiconductor booster circuit is infinite.

In addition, in the semiconductor booster circuit according to the present embodiment, even in the low power supply voltage Vdd which can not be boosted by the conventional booster circuit, the desired output can be obtained. In other words, in the conventional booster circuit, as shown in FIG. 21, even if the number n of stages of the booster circuit is set to any value, the maximum output voltage is limited to a predetermined value depending on the power supply voltage Vdd. However, in the semiconductor booster circuit according to the present embodiment, such a limit is not present substantially.

For example, in the case where the power supply voltage Vdd is 2.0V, assuming that the capacitance ratio C/(C+Cs) is 0.9, the absolute value of the threshold voltage |Vt| is 0.6V, and the load current $I_{OUT}$ in the output stage is zero, even in the booster circuit in which the number n of stages of the booster circuit is 50, only 12V can be obtained as the output voltage $V_{POUT}$ in the conventional booster circuit. In the booster circuit according to the present embodiment, when the number n of stages of the booster circuit is 20, about 37V can be obtained as the output voltage $V_{POUT}$, and also when the number n of stages of the booster circuit is 50, about 91V can be obtained.

Incidentally, in the semiconductor booster circuit according to the present embodiment, in the case where the absolute value of the threshold voltage |Vt| is set to 0.6V, the lower limit of the boostable power supply voltage Vdd is about 0.7V.

In the above explanation, the substrates of the MOS transistors in n stages are electrically insulated from each other. Alternatively, the n stages are divided into at least two groups, for example two groups i.e. a first group of the first to third stages and a second group of the fourth to sixth stages. The substrates of the MOS transistors included in each group are electrically insulated form the substrates of the MOS transistors included in the other group.

Next, the description will hereinbelow be given with respect to a semiconductor booster circuit according to a second embodiment of the present invention with reference to FIGS. 7 and 8.

Figure 7:
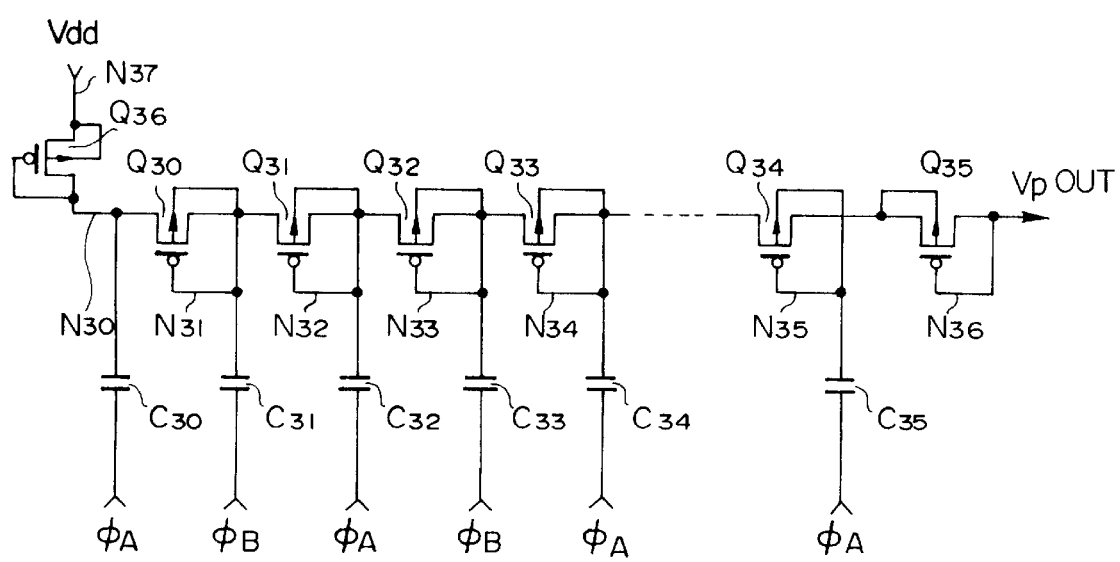
FIG. 7 is a circuit diagram showing a configuration of a semiconductor booster circuit according to a second embodiment of the present invention.

FIG. 7 is a circuit diagram showing a configuration of the semiconductor booster circuit according to the second embodiment of the present invention.

In FIG. 7, n elements of P-channel MOS transistors $Q_{30}$ to $Q_{34}$ are connected in cascade to configure a booster circuit having n stages. Substrate portions of the respective transistors $Q_{30}$ to $Q_{34}$ are electrically insulated from one another, and also gate terminals and the substrate portions are connected to respective source terminals $N_{31}$ to $N_{35}$. Then, a clock signal $\phi_A$ or $\phi_B$ which is shown in FIG. 8 is inputted to the source terminals $N_{30}$ to $N_{35}$ through capacitors $C_{30}$ to $C_{35}$, respectively.

In the booster circuit of the present embodiment, as an inputted signal, the power supply voltage Vdd is inputted from a source terminal $N_{37}$ of a P-channel MOS transistor $Q_{36}$ to a drain terminal $N_{30}$ of the transistor $Q_{30}$. As an output signal, an output voltage $V_{POUT}$ is outputted from an output terminal $N_{36}$ through a P-channel MOS transistor $Q_{35}$.

Figure 8:
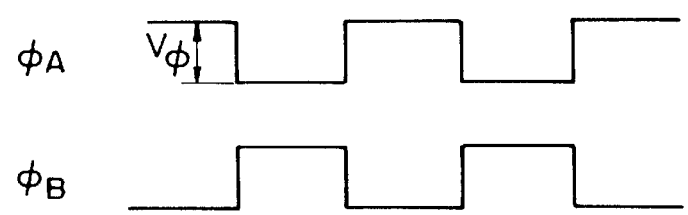
FIG. 8 is a timing chart showing clock pulses used in the semiconductor booster circuit shown in FIG. 6.

The clock signals $\phi_A$ and $\phi_B$ are, as shown in FIG. 8, in opposite phase with each other and have the amplitude of a voltage $V_\phi$.

In addition, the device structure of the transistors $Q_{30}$ to $Q_{34}$ of the present embodiment may be the same as that shown in FIG. 6. That is, the N type well regions 11 are formed in the P type semiconductor substrate, and in each of the N type well regions 11, the polycrystalline silicon layer 16 which is formed on the substrate portion of the well region 11 with an intermediate gate oxide film 15 therebetween is provided as the gate electrode. and also the P+ type impurity diffusion layer 12 is provided as the source/drain region. In such a manner, the MOS transistor is formed.

The P+ type impurity diffusion layer 12 of the source side of each of the transistors is connected to the N type well region 11 through the N+ type impurity diffusion layer 14, and also the source of the transistor in the preceding stage is connected to the drain of the transistor in the subsequent stage. As a result, the potential at the N type well region as the substrate portion of each of the transistors is fixed to the source potential of each of the transistors, and hence the substrate effect is effectively prevented from occurring.

In addition, the PN junction, which is formed between the P+ type impurity diffusion layer 12 of the drain side and the N type well region of each of the transistors, is biased in the forward direction, whereby through that PN junction, the electric charges are transferred from the node $N_A$ to the node $N_B$ and from the node $N_B$ to the node $N_D$ through the N type well region 11 of the substrate portion and the N+ type impurity diffusion layer 14. In the case of the present embodiment, each transistor is not rendered substantially perfectly conductive unlike the state as shown in FIGS. 5B and 5E of the above-mentioned first embodiment, and hence the transfer of the electric charges from the preceding stage to the subsequent stage is performed through the above-mentioned PN junction. Therefore, in the case of the present embodiment, the potential difference corresponding to the forward bias voltage $V_F$ (normally, about 0.7V) across the PN junction which is independent of the threshold voltage Vt of the MOS transistor is utilized for the boosting operation, and also $V_F$ is employed instead of Vt in the above-mentioned expressions (1) and (2). Since that forward bias voltage $V_F$ across the PN junction is not influenced by the substrate effect at all, it is possible to realize the booster circuit in which even when the number of stages of the booster circuit is increased, the reduction of the boosting capability due to the substrate effect does not occur at all.

More specifically, in the present embodiment, as shown in FIG. 7, the substrate portions of the transistors $Q_{30}$ to $Q_{34}$ are electrically connected to the source terminals $N_{31}$ to $N_{35}$, respectively, whereby the PN junction which is formed in the boundary between the drain and the substrate portion is connected in parallel between the source and the drain of each of the transistors $Q_{30}$ to $Q_{34}$. Then, when transferring the electric charges from the preceding stage to the subsequent stage in the booster circuit, the PN junction is rendered conductive, whereby the potential at the substrate portion of each of the transistors $Q_{30}$ to $Q_{34}$ can be fixed to the potential difference corresponding to the forward bias voltage $V_F$ (normally, about 0.7V) across the PN junction. Therefore, it is possible to suppress the influence of the substrate effect.

Next, the description will hereinbelow be given with respect to a semiconductor booster circuit according to a third embodiment of the present invention with reference to FIGS. 9 and 10.

Figure 9:
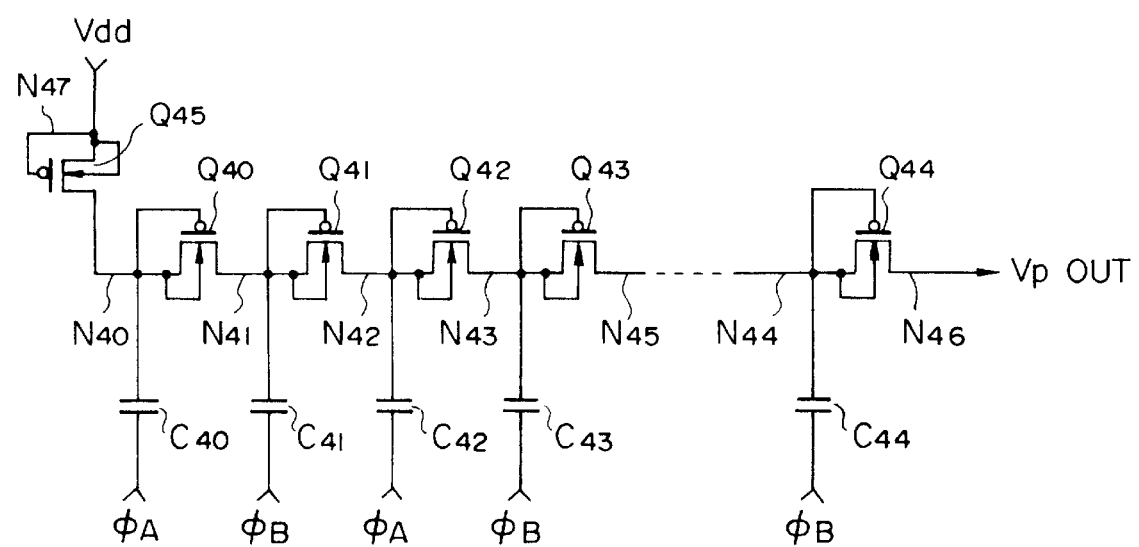
FIG. 9 is a circuit diagram showing a configuration figuration of a semiconductor booster circuit according to a third embodiment of the present invention.

FIG. 9 is a circuit diagram showing a configuration of the semiconductor booster circuit according to the third embodiment of the present invention.

In FIG. 9, N-channel MOS transistors $Q_{40}$ to $Q_{44}$ are connected in cascade to configure the booster circuit having n stages. Substrate portions of the respective transistors $Q_{40}$ to $Q_{44}$ are electrically insulated from one another, and also the substrate portions and gate terminals are connected to respective source terminals $N_{40}$ to $N_{44}$. Then, the clock signal $\phi_A$ or $\phi_B$ which is the same as that shown in FIG. 8 is inputted to the terminals $N_{40}$ to $N_{44}$ through capacitors $C_{40}$ to $C_{44}$, respectively.

In the booster circuit according to the present embodiment, the power supply voltage Vdd is inputted as an input signal from a source terminal $N_{47}$ of an N-channel MOS transistor $Q_{45}$ to the terminal $N_{40}$, and also the output voltage $V_{POUT}$ is outputted as an output signal from an output terminal $N_{46}$ through the N-channel MOS transistor $Q_{44}$.

Figure 10:
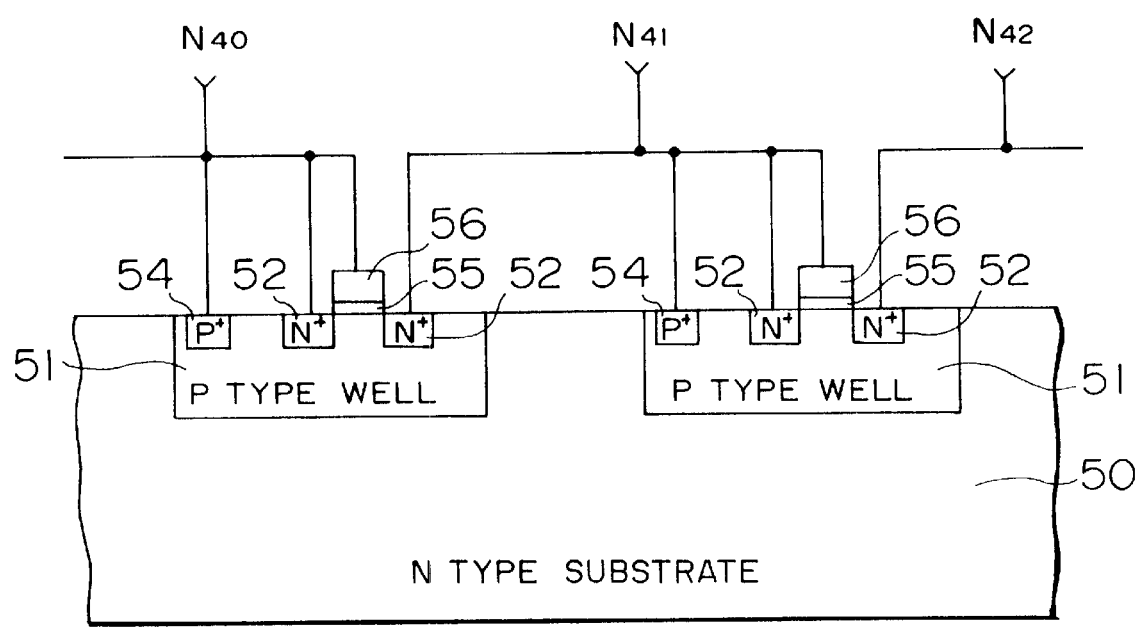
FIG. 10 is a cross sectional view showing a device structure of the semiconductor booster circuit shown in FIG. 9.

FIG. 10 shows a device structure of the transistors $Q_{40}$ to $Q_{44}$ according to the present embodiment.

In FIG. 10, P type well regions 51 are formed in an N type semiconductor substrate 50, and in each of the P type well regions 51, a polycrystalline silicon layer 56 which is formed on the substrate portion of the well region 11 with a gate oxide film 55 disposed therebetween is provided as a gate electrode, and also an $N^+$ type impurity diffusion layer 52 is provided as a source/drain region. In such a manner, the MOS transistor is formed.

The $N^+$ type impurity diffusion layer 52 of the source side of each of the transistors is electrically connected to the P type well region 51, in which the transistor is formed, through the $P^+$ type impurity diffusion layer 54, and the source of the transistor in the preceding stage is connected to the drain of the transistor in the subsequent stage.

As a result, the potential at the P type well region of the substrate portion of each of the transistors is fixed to the source potential of each of the transistors, and hence the substrate effect can be effectively prevented from occurring.

In addition, the PN junction is formed between the $N^+$ type impurity diffusion layer 52 of the drain side and the P type well region 51 of each of the transistors. When in the operation, the PN junction is biased in the forward direction, the potential at the substrate portion of each of the transistors is fixed to the forward bias voltage across the PN junction. In such a manner, the substrate effect can be effectively prevented from occurring.

As described above, in the semiconductor booster circuit according to the third embodiment of the present invention, the substrate portions of the MOS transistors are electrically insulated from one another, and also the substrate portions are electrically connected to the source terminals of the MOS transistors, respectively, whereby it is possible to prevent the increase of the threshold voltage Vt due to the substrate effect. Therefore, it is possible to obtain the output voltage $V_{POUT}$ proportional to the number n of stages of the semiconductor booster circuit.

In addition, with respect to the device structure, as shown in FIG. 10, the P type well regions 51 in which the transistors $Q_{40}$ to $Q_{44}$ are respectively formed are formed independently of each other and also the $P^+$ type impurity diffusion region of each of the P type well regions is electrically connected to the $N^+$ type impurity diffusion region 52 of the source side of each of the transistors $Q_{40}$ to $Q_{44}$. Therefore, in particular, the number of manufacturing processes is not increased at all.

In addition, the substrate portions of the transistors $Q_{40}$ to $Q_{44}$ are electrically connected to the source terminals $N_{40}$ to $N_{44}$, respectively, whereby the PN junction which is formed in the boundary between the drain and the substrate portion is connected in parallel between the source and the drain of each of the transistors $Q_{40}$ to $Q_{44}$. Then, when transferring the electric charges from the preceding stage to the subsequent stage in the booster circuit, the PN junction is switched to the on state, whereby the potential at the substrate portion of each of the transistors $Q_{40}$ to $Q_{44}$ can be fixed to the potential difference corresponding to the forward bias voltage $V_F$ (normally, about 0.7V) across the PN junction. Thus, it is possible to suppress the influence of the substrate effect.

In the semiconductor booster circuits according to the second and third embodiments of the present invention, the forward junction bias voltage $V_F$ can be employed instead of the threshold voltage Vt in the above-mentioned expressions (1) and (2). In particular, in the case where the threshold voltage Vt is larger than the forward junction bias voltage $V_F$, since the voltage drop when transferring the electric charges from the preceding stage to the subsequent stage in the booster circuit is reduced, it is possible to improve the boosting capability of the booster circuit. That is, the voltage drop when the electric charges are transferred to the subsequent stage depends on the smaller one of the threshold voltage Vt and the forward junction bias voltage $V_F$.

For example, in the case where the power supply voltage Vdd is 2.5V and the number n of stages of the booster circuit is 20, assuming that the capacitance ratio C/(C+Cs) is 0.9, the absolute value of the threshold voltage |Vt| is 0.6V, the load current $I_{OUT}$ in the output stage is 0 A, and the forward junction bias voltage $V_F$ across the PN junction is 0.7V, only 20V can be obtained as the output voltage $V_{POUT}$ in the conventional booster circuit. But in the booster circuit according to the third embodiment of the present invention, about 33V can be obtained as the output voltage $V_{POUT}$.

In addition, for example, in the case where the power supply voltage Vdd is 2.0V, assuming that the capacitance ratio C/(C+Cs) is 0.9, the absolute value of the threshold voltage |Vt| is 0.6V, the load current $I_{OUT}$ in the output stage is 0 A, and the forward junction bias voltage $V_F$ across the PN junction is 0.7V, only 12V can be obtained as the output voltage $V_{POUT}$ in the conventional booster circuit, even when the number n of stages of the booster circuit is 50. But in the booster circuit according to the third embodiment of the present invention, when the number n of stages of the booster circuit is 20, about 23V can be obtained as the output voltage $V_{POUT}$, and also when the number n of stages of the booster circuit is 50, about 56V can be obtained.

In the semiconductor booster circuits according to the second and third embodiments of the present invention, assuming that the forward junction bias voltage $V_F$ across the PN junction is 0.7V, and the capacitance ratio C/(C+Cs) is 0.9, the lower limit of the boostable power supply voltage Vdd is about 0.8V.

In the above, the description has been given with respect to the first, second and third embodiments of the present invention since in the booster circuit according to the first embodiment, the voltage drop when transferring the electric charges to the subsequent stage can be made substantially zero, and hence, the booster circuit according to the first embodiment has the larger boosting capability as compared with the booster circuits according to the second and third embodiments. In particular, in the power supply voltage Vdd of about 0.8V to 2.0V, the difference in the boosting capability between the booster circuit according to the first embodiment and the booster circuit according to the second or third embodiment becomes remarkably large.

In particular, in the power supply voltage Vdd of about 0.8V to 2.0V, when the desired output voltage is larger, the number n of stages needs to be increased in the booster circuits according to the second and third embodiments due to the voltage drop when transferring the electric charges to the subsequent stage. However, in the booster circuit according to the first embodiment, this is not required. For example, in the case where the power supply voltage Vdd is 2.0V, the number n of stages of the booster circuit required for obtaining 23V as the output voltage $V_{POUT}$ is 20 in the booster circuits according to the second and third embodiments, but only 12 in the booster circuit according to the first embodiment.

On the other hand, the booster circuit according to the second or third embodiment is advantageous as compared with the booster circuit according to the first embodiment in that the circuit configuration is simpler and also only two kinds of clock signals are sufficient.

In any one of the above-mentioned embodiments, since the substrate portions of the MOS transistors are electrically insulated from one another, and also the substrate portions are electrically connected to the source terminals of the MOS transistors, respectively, the substrate effect can be effectively prevented from occurring. Therefore, the high boosting capability can be obtained.

In addition, no complicated manufacturing process is especially required.

Further, in the case where the same boosting capability is obtained, the number of stages of the booster circuit can be further reduced as compared with the prior art.

Therefore, in the above-mentioned expression (1), the threshold voltage Vt can be regarded as zero, and therefore, as compared with the conventional booster circuit, the boosting operation can be more efficiently performed. Thus, even in the case where the number n of stages of the booster circuit, and the power supply voltage Vdd are the same as those of the conventional booster circuit, it is possible to obtain a larger output voltage $V_{POUT}$ than that of the conventional booster circuit.

For example, in the case where the power supply voltage Vdd is 2.5V, and the number n of stages of the booster circuit is 20, assuming that the capacitance ratio C/(C+Cs) is 0.9, the absolute value of the threshold voltage |Vt| is 0.6V, the load current $I_{OUT}$ in the output stage is zero, and the boosted voltage Vhh is 3.0V, only 20V can be obtained as the output voltage $V_{POUT}$ in the conventional circuit, but in the booster circuit according to the present embodiment, about 47V can be obtained as the output voltage $V_{POUT}$ This means that in the case where the output voltage $V_{POUT}$ is the same, the booster circuit according to the present embodiment can provide a larger load current $I_{OUT}$ than that in the conventional circuit.

In addition, in the booster circuit according to the present embodiment, as can be seen from FIG. 10, even with a low power supply voltage Vdd which can not be boosted by the conventional circuit, the desired output voltage can be obtained.

For example, assuming that the capacitance ratio C/(C+Cs) is 0.9, the absolute value of the threshold voltage |Vt| is 0.6V, the load current $I_{OUT}$ in the output stage is zero, and the boosted voltage Vhh is 3.0V, the power supply voltage Vdd needs to be set to 2.5V or more, in the conventional booster circuit, in order to obtain 20V as the output voltage $V_{POUT}$, but only 1.5V is sufficient for the power supply voltage Vdd in the booster circuit according to the present embodiment.

According to the fourth embodiment, since the clock signal which is used to render the MOS transistor constituting each of the stages conductive is boosted so as to have a larger amplitude than the power supply voltage Vdd, the desired output voltage can be obtained even in the case where the power supply voltage is low.

In addition, in the case where the power supply voltage is constant, a larger load current than that in the prior art can be obtained.

Furthermore, in the case where the same output voltage as that in the prior art is to be obtained, the number of stages of the booster circuit can be further reduced as compared with the prior art.

Next, the description will hereinbelow be given with respect to a fifth embodiment of the present invention with reference to FIGS. 11 and 12.

Figure 11:
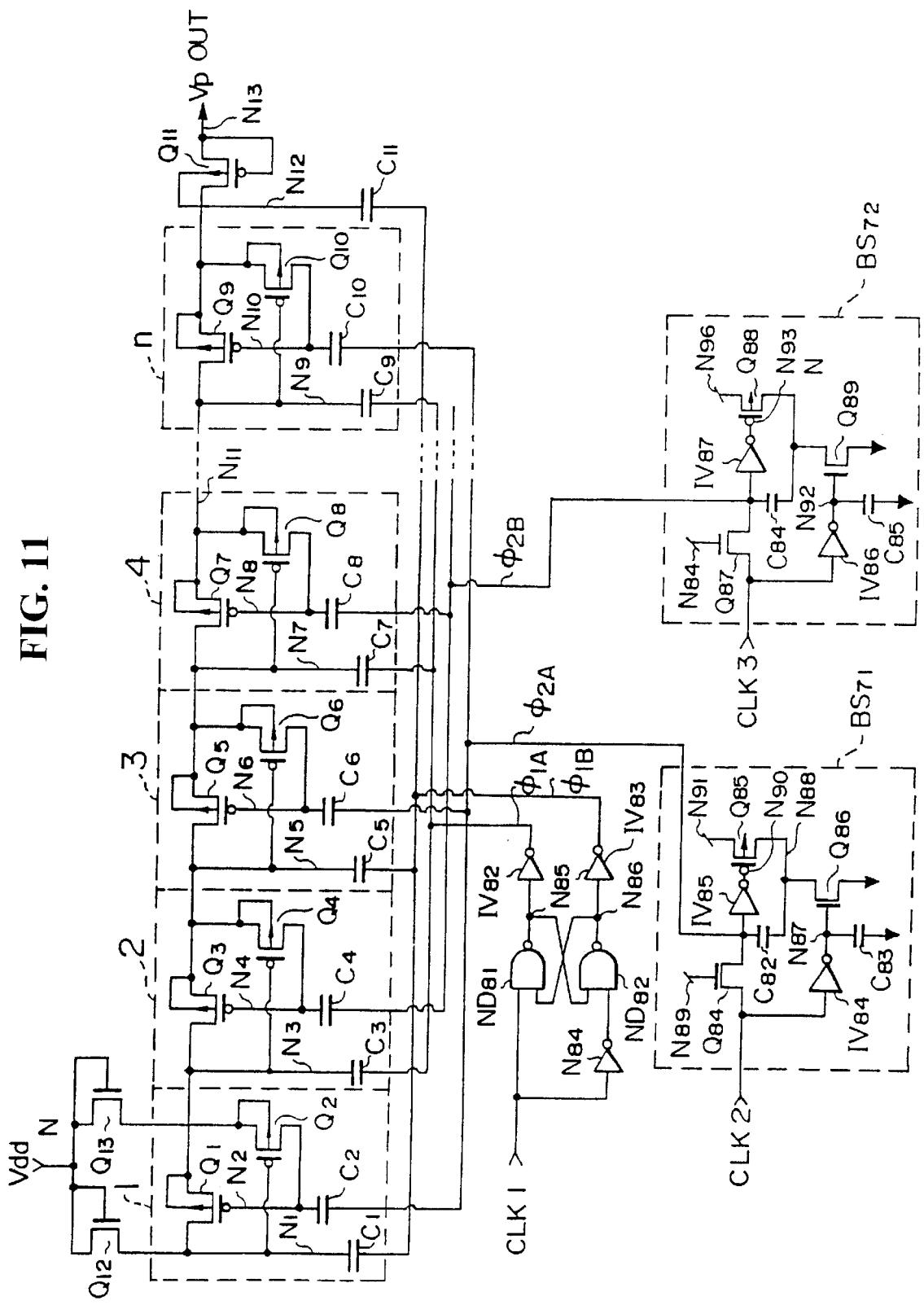
FIG. 11 is a circuit diagram showing a configuration of a semiconductor booster circuit according to a fifth embodiment of the present invention.

A circuit configuration shown in FIG. 11 is identical to that of FIG. 1 except for the provision of bootstrap circuits $BS_{71}$ and $BS_{72}$ illustrated in the lower half of the figure. Therefore, the operation of the booster circuit according to the fifth embodiment of the present invention is substantially the same as that of the booster circuit according to the first embodiment. That is, the configuration of the first and second stages which are consecutive in the booster circuit of the fifth embodiment is the same as that of FIG. 2. Then, when the clock signals $\phi_{1A}$, $\phi_{1B}$, $\phi_{2A}$ and $\phi_{2B}$ are inputted according to the timing diagram as shown in FIG. 12 in the booster circuit of FIG. 11, the state in change of the operation of each of the transistors of the booster circuit as shown in FIG. 2 and the tendency in change of the potentials at the nodes $N_A$, $N_B$, $N_C$ and $N_D$ are the same as those in the first embodiment shown in FIGS. 5A to 5F and FIGS. 4A and 4D. The only differences between the first embodiment and the fifth embodiment are as follows.

Figure 12:
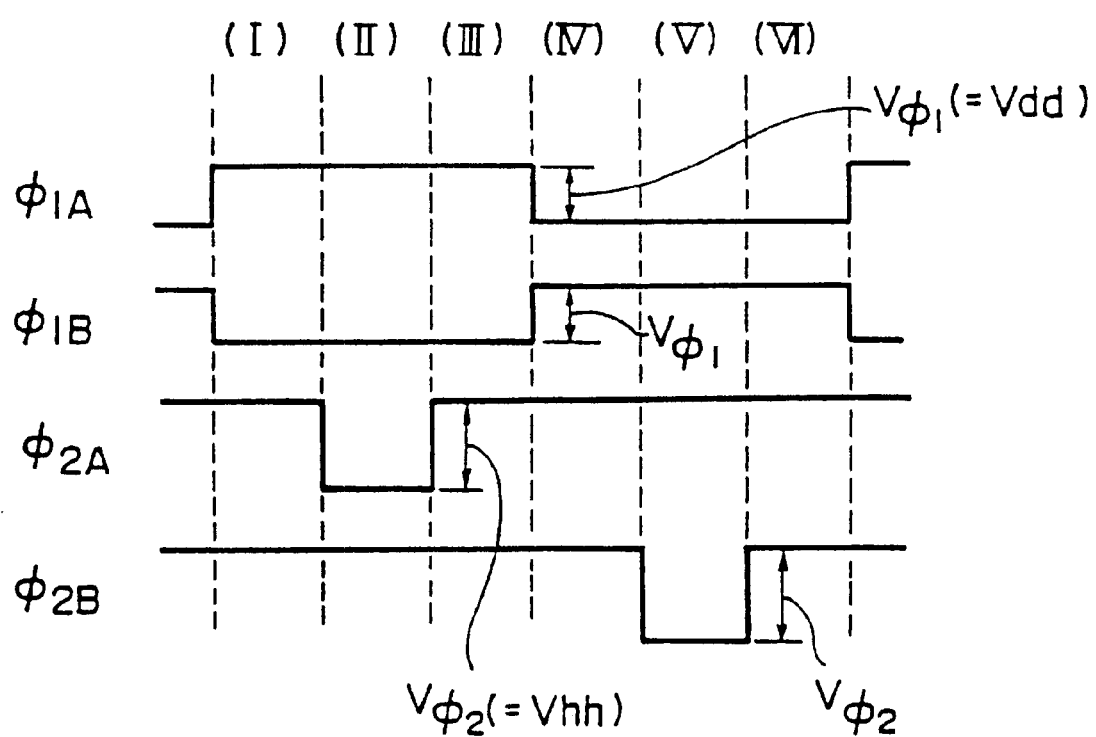
FIG. 12 is a timing chart showing clock pulses used in the semiconductor booster circuit shown in FIG. 11.

(a) For a period of time of (II) of FIG. 12, the potential at the gate terminal $N_C$ of the transistor $M_1$ is dropped as shown in FIG. 4C. However, the voltage drop is equal to the power supply voltage Vdd in the first embodiment, but is equal to the boosted voltage Vhh in the fifth embodiment.

(b) For a period of time of (III) of FIG. 12, the potential at the gate terminal $N_C$ of the transistor $M_1$ is raised as shown in FIG. 4C. In this connection, the raised voltage is equal to the power supply voltage Vdd in the first embodiment, but is equal to the boosted voltage Vhh in the fifth embodiment.

(c) For a period of time of (V) of FIG. 12, the potential at the gate terminal $N_E$ of the transistor $M_3$ is dropped. In this connection, the voltage drop is equal to the power supply voltage Vdd in the first embodiment, but is equal to the boosted voltage Vhh in the fifth embodiment.

(d) For a period of time of (VI) of FIG. 12, the potential at the gate terminal $N_E$ of the transistor $M_3$ is raised. In this connection, the raised voltage is equal to the power supply voltage Vdd in the first embodiment, but is equal to the boosted voltage Vhh in the fifth embodiment.

Next, the description will hereinbelow be given with respect to the operation of the bootstrap circuit $BS_{71}$ with reference to FIGS. 11 and 12.

Figure 13:
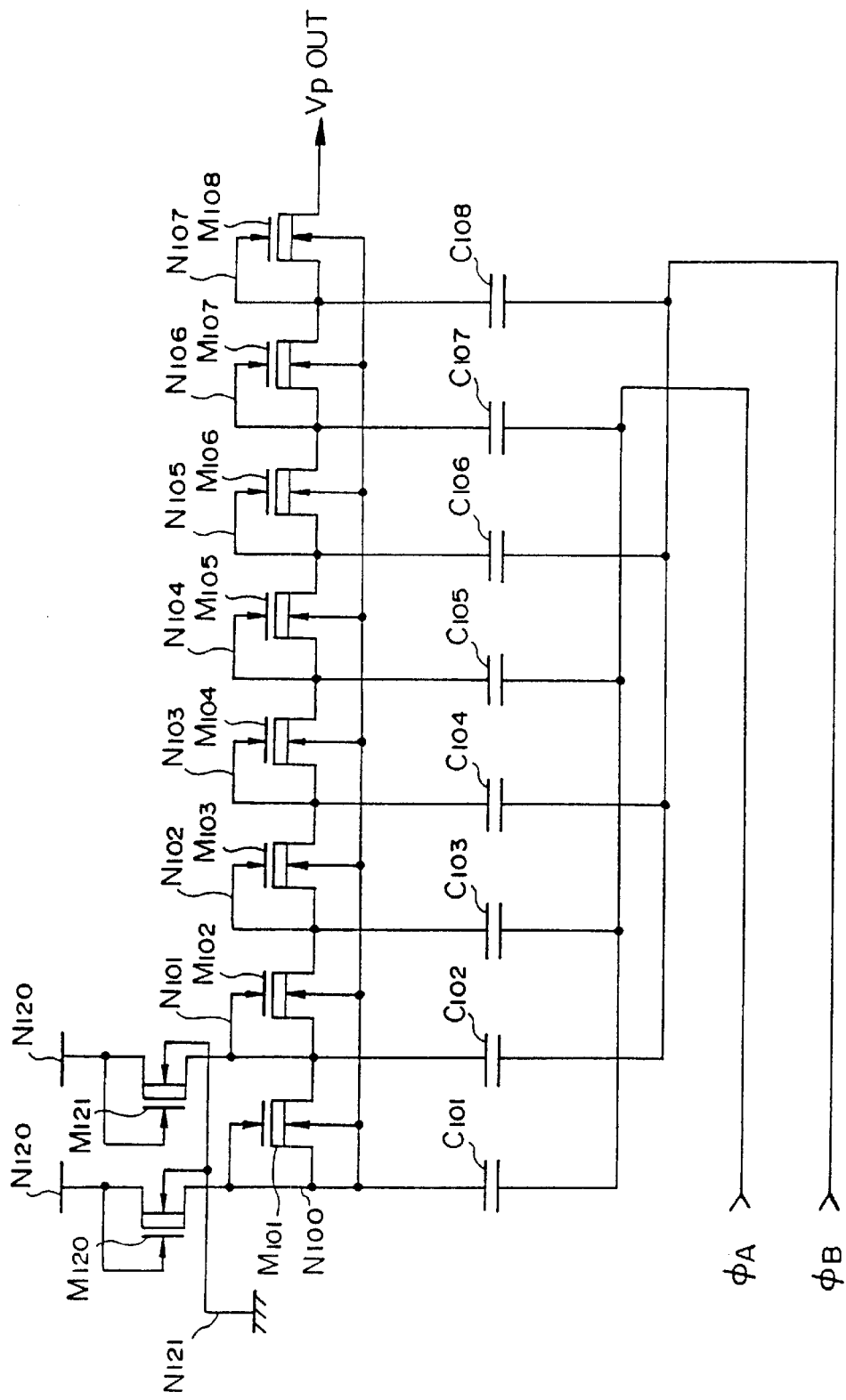
FIG. 13 is a circuit diagram showing a configuration of a semiconductor booster circuit according to a sixth embodiment of the present invention.

Firstly, the level of the clock signal $CLK_2$ shown in FIG. 13 is changed from 0V up to Vdd. At first, the potential of $\phi_{2A}$ is changed from 0V to Vdd−Vt (Vt is the threshold voltage of the transistor $Q_{84}$). The threshold voltage Vt of the transistor $Q_{84}$ is, for example, 0.1V. When Vdd=1V, and the clock signal $CLK_2$ is changed from 0V to 1V, the initial potential of $\phi_{2A}$ becomes 0.7V (Vt of the transistor $Q_{84}$ is raised by about 0.2V due to the back bias effect). At the same time, the inverter $IV_{85}$ performs the inversion operation at the time when the level of the input voltage $\phi_{2A}$ has exceeded the logical threshold voltage (normally, about Vdd/2), and also the potential at the node $N_{90}$ is dropped from Vdd to 0V. As a result, the transistor $Q_{85}$ is turned on.

Next, on the basis of the function of both the inverter $IV_{84}$ and the capacitor $C_{83}$, the potential at the node $N_{87}$ is changed from Vdd down to 0V after a predetermined time delay from the clock signal $CLK_2$ and the node $N_{90}$.

Therefore, although the transistor $Q_{86}$ is initially in the on-state, after a predetermined time delay, the transistor $Q_{86}$ is turned off. Until a lapse of the predetermined time delay, both the transistors $Q_{85}$ and $Q_{86}$ are in the on state. In this connection, by setting the on-resistance of the transistor $Q_{86}$ to a value sufficiently smaller than the on-resistance of the transistor $Q_{85}$, the potential at the node $N_{88}$ is maintained at about 0V until a lapse of the predetermined time delay. That is, after a lapse of the predetermined delay time, the potential at the node $N_{88}$ is changed from about 0V to Vdd.

Next, at the same time the potential at the node $N_{88}$ is changed from about 0V to Vdd, the potential of the clock signal $\phi_{2A}$ goes to (2Vdd−Vt) on the basis of the function of the capacitor $C_{82}$. Thus, it is possible to obtain the larger voltage than Vdd. For example, in the case of Vdd=1V, the level of the clock signal $\phi_{2A}$ settles to 1.7V.

The above description also applies to the other bootstrap circuit $BS_{72}$.

Therefore, by inputting the clock signals $CLK_2$ and $CLK_3$ to the bootstrap circuits $BS_{71}$ and $BS_{73}$, respectively, it is possible to obtain the clock signals $\phi_{2A}$ and $\phi_{2B}$ each having a larger amplitude than the power supply voltage Vdd.

The fifth embodiment offers basically the same effects as those of the first embodiment in that the high output voltage can be obtained. In addition, in the fifth embodiment, the level of each of the clock signals $\phi_{2A}$ and $\phi_{2B}$ is boosted by the bootstrap circuit $BS_{71}$ or $BS_{72}$ to a larger amplitude than the power supply voltage Vdd, whereby the gate voltage of each of the MOS transistors $Q_1, Q_3, Q_5, Q_7, \ldots, Q_9$, which are connected in cascade, can be made higher than that in the prior art. Therefore, even if the threshold voltage Vt is increased due to the substrate effect, the MOS transistors $Q_1, Q_3, Q_5, Q_7, \ldots, Q_9$ can be normally turned on, and hence it is possible to obtain the output voltage $V_{POUT}$ which is increased in proportion to the number n of stages of the semiconductor booster circuit.

The relationship between the number of stages of the booster circuit and the output voltage is substantially the same as that in the fourth embodiment shown in FIG. 9.

In addition, in the semiconductor booster circuit according to the present embodiment, the MOS transistors $Q_1, Q_3, Q_5, Q_7, \ldots, Q_9$ are driven by the clock signals $\phi_{2A}$ and $\phi_{2B}$ which are respectively obtained by boosting the clock signals $CLK_2$ and $CLK_3$ to a larger amplitude than the power supply voltage Vdd, whereby the MOS transistors $Q_1, Q_3, Q_5, Q_7, \ldots, Q_9$ can be sufficiently turned on even with the very low power supply voltage value (e.g., Vdd=0.7 to 1.0V).

In the present embodiment, the lowest power supply voltage which can be boosted is determined by the threshold voltage Vt of each of the P-channel MOS transistors $Q_1, Q_3, Q_5, Q_7, \ldots, Q_9$ constituting the booster circuit. As in the first embodiment, in the case where the amplitude $V_{\phi2}$ of each of the clock signals $\phi_{2A}$ and $\phi_{2B}$ is equal to the power supply voltage Vdd, the voltage drop at the node $N_C$ in a period of time of (II) 'shown in FIG. 4C does not reach the threshold voltage Vt (e.g., −0.6V) of each of the P-channel MOS transistors $Q_1, Q_3, Q_5, Q_7, \ldots, Q_9$ if Vdd becomes equal to or lower than 1V and hence the P-channel MOS transistors $Q_1, Q_3, Q_5, Q_7, \ldots, Q_9$ can not be sufficiently turned on. On the other hand, as in the fifth embodiment, the amplitude $V_{\phi2}$ of each of the clock signals $\phi_{2A}$ and $\phi_{2B}$ is boosted by the bootstrap circuit $BS_1$ or $BS_2$ to a larger amplitude than the power supply voltage Vdd, whereby the boosting operation can be stably performed even in the very low power supply voltage value of Vdd=0.7 to 1.0V. In addition, since the P-channel MOS transistors $Q_1, Q_3, Q_5, Q_7, \ldots, Q_9$ can be sufficiently turned on, it is also possible to prevent the reduction of the boosting capability of the booster circuit.

Now, the description will hereinbelow be given with respect to the relationship between the power supply voltage Vdd and the maximum output voltage $V_{POUT}$ when making the number of stages of the booster circuit infinite with reference to FIG. 10. In the case of the conventional booster circuit, even if Vdd becomes larger than Vto, the relationship has a characteristic as shown in the curve (c) of FIG. 10 since Vt is increased due to the substrate effect with the increase of the output voltage $V_{POUT}$. On the other hand, in the booster circuit of the present embodiment, in the case where the relation of $V_{\phi1}=V_{\phi2}=V_\phi=Vdd$ is established, and also the parasitic capacity can be disregarded i.e., for example, the relation of C/(C+Cs)=1 is established, the boosting operation can be performed depending on only the number n of stages of the booster circuit if the desired voltage equal to or higher than $Vdd=V_\phi=Vto$ is obtained. However, actually, since the parasitic capacity can not be disregarded, e.g. C/(C+Cs) is about 0.9, the boosting operation can not be performed when V=Vdd, unless Vdd is equal to or larger than 1.1, like the fourth embodiment. In addition in the MOS transistor, even if the gate to source voltage exceeds Vto slightly, the boosting capability of the booster circuit is slightly reduced since the source to drain resistance is large and hence the booster circuit provides a characteristic as shown in the curve (b) of FIG. 10.

On the other hand, in the structure of the fifth embodiment, since $V_{\phi2}$ can be set to 1.7 Vdd for example, it is possible to supply a gate to source voltage by which the MOS transistor can be sufficiently turned on even if the parasitic capacity is present. As a result, the fifth embodiment provides a characteristic as shown in the curve (a) of FIG. 10.

Next, the description will hereinbelow be given with respect to a sixth embodiment of the present invention with reference to FIGS. 13 and 14.

FIG. 13 shows a configuration of a semiconductor booster circuit according to the sixth embodiment of the present invention.

Figure 16:
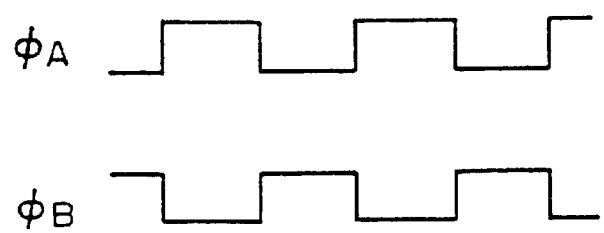
FIG. 16 is a timing chart showing clock pulses used in the semiconductor booster circuit shown in FIG. 13.

As shown in FIG. 13, N-channel depletion type MOS transistors $M_{101}$ to $M_{108}$ are connected in series between an input terminal $N_{120}$ and an output terminal to configure a booster circuit having four stages. That is, each pair of the transistors $M_{101}$ and $M_{102}$; $M_{103}$ and $M_{104}$; $M_{105}$ and $M_{106}$; $M_{107}$ and $M_{108}$ constitute respective stages. Gate terminals of the transistors $M_{101}$ to $M_{108}$ are respectively connected to drain terminals (represented by nodes $N_{100}$ to $N_{107}$). Then, a clock signal $\phi_A$ which is shown in FIG. 16 is inputted through capacitors $C_{101}$, $C_{103}$, $C_{105}$ and $C_{107}$, respectively, to the drain terminals $N_{100}$, $N_{102}$, $N_{104}$ and $N_{106}$ and also a clock signal $\phi_B$ which is in opposite phase with the clock signal $\phi_A$ is inputted through capacitors $C_{102}$, $C_{104}$, $C_{106}$ and $C_{108}$, respectively, to the drain terminals $N_{101}$, $N_{103}$, $N_{105}$ and $N_{107}$. In addition, both drain terminals and gate terminals of N-channel MOS transistors $M_{120}$ and $M_{121}$ are connected to the input terminal (represented by a node $N_{120}$), and substrate terminals thereof are connected to a ground terminal (represented by a node $N_{121}$).

In addition, substrate terminals of the transistors $M_{101}$ to $M_{108}$ are divided into two groups, as will be described later, i.e., the group of the transistors $M_{101}$ to $M_{104}$ and the group of the transistors $M_{105}$ to $M_{108}$. In this connection, the substrate terminals of the transistors $M_{101}$ to $M_{104}$ and the substrate terminals of the transistors $M_{105}$ to $M_{108}$ are respectively connected to the drain terminal $N_{104}$ of the transistor $M_{101}$ and the drain terminal $N_{104}$ of the transistor $M_{105}$.

That is, the node $N_{100}$ is connected to the source terminal of the transistor $M_{120}$, both the drain terminal and the gate terminal of the transistor $M_{101}$, one terminal of the capacitor $C_{101}$ and the substrate terminals of the transistors $M_{101}$ to $M_{104}$. The node $N_{101}$ is connected to the source terminal of the transistor $M_{121}$, both the drain terminal and the gate terminal of the transistor $M_{102}$, the source terminal of the transistor $M_{101}$ and one terminal of the capacitor $C_{102}$. The node $N_{102}$ is connected to both the drain terminal and the gate terminal of the transistor $M_{103}$, the source terminal of the transistor $M_{102}$ and one terminal of the capatcitor $C_{103}$. The node $N_{103}$ is connected to both the drain terminal and the gate terminal of the transistor $M_{104}$, the source terminal of the transistor $M_{103}$ and one terminal of the capacitor $C_{104}$. The node $N_{104}$ is connected to both the drain terminal and the gate terminal of the transistor $M_{105}$, the source terminal of the transistor $M_{104}$, one terminal of the capacitor $C_{105}$ and the substrate terminals of the transistors $M_{105}$ to $M_{108}$. The node $N_{105}$ is connected to both the drain terminal and the gate terminal of the transistor $M_{106}$, the source terminal of the transistor $M_{105}$ and one terminal of the capacitor $C_{106}$. The node $N_{106}$ is connected to both the drain terminal and the gate terminal of the transistor $M_{107}$, the source terminal of the transistor $M_{106}$ and one terminal of the capacitor $C_{107}$. In addition, the node $N_{107}$ is connected to both the drain terminal and the gate terminal of the transistor $M_{108}$, the source terminal of the transistor $M_{107}$ and one terminal of the capacitor $C_{108}$. Further, he output terminal of the semiconductor booster circuit is connected to the source terminal of the transistor $M_{108}$.

Figure 22:
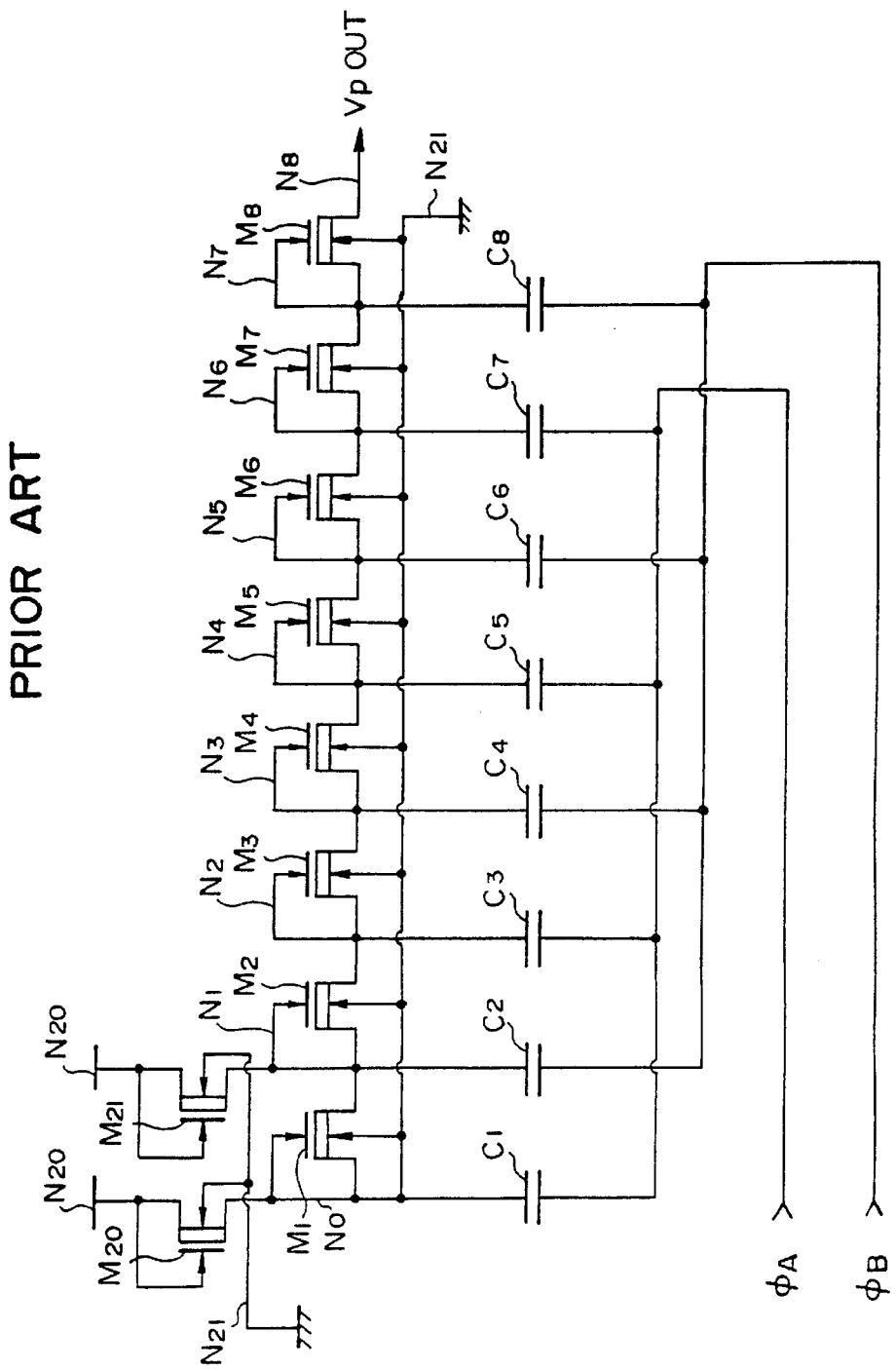
FIG. 22 is a circuit diagram showing a configuration of another conventional prior art semiconductor booster circuit.
Figure 23:
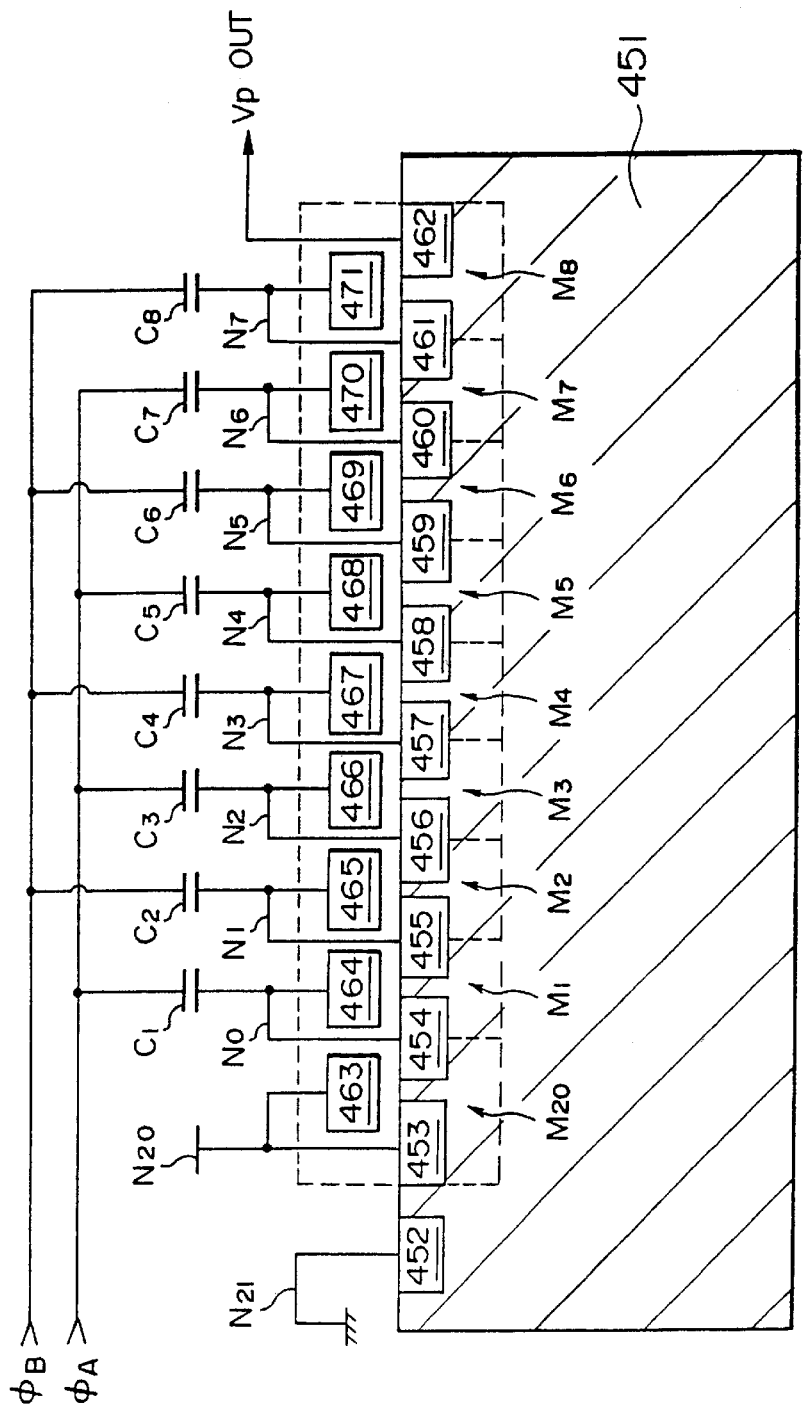
FIG. 23 is a cross sectional view showing a device structure of another conventional prior art semiconductor booster circuit.

In this configuration, the series-connected our stages are divided into a group of two stages of he input side including the transistors $M_{101}$ to $M_{104}$ and group of two stages of the output side including the transistors $M_{105}$ to $M_{108}$. Therefore, the substrate terminals of the transistors $M_{101}$ to $M_{108}$ are divided into the group of substrate terminals of the transistors $M_{101}$ to $M_{104}$ and the group of substrate terminals of the transistors $M_{105}$ to $M_{108}$. In this connection, the substrate terminals of the transistors $M_{101}$ to $M_{104}$ are connected to the drain terminal $N_{100}$ of the transistor $M_{101}$ and the substrate terminals of the transistors $M_{105}$ to $M_{108}$ are connected to the drain terminal $N_{104}$ of the transistor $M_{105}$. Therefore, as compared with the conventional booster circuit shown in FIG. 22, a substrate bias voltage Vbs of the transistors $M_{101}$ to $M_{107}$ in the booster circuit of the present embodiment is smaller than that of the transistors $M_1$ to $M_7$ in the conventional booster circuit. As a result, the threshold voltage Vt of the transistors $M_{105}$ to $M_{108}$ in the booster circuit of the present embodiment is lower than that of the transistors $M_5$ to $M_8$ in the conventional booster circuit. As a result, as compared with the conventional booster circuit, the boosting capability is further improved in the booster circuit of the present embodiment so that the high output voltage is obtained, and also the number of stages required for obtaining the same output voltage can be further reduced, as compared with the conventional booster circuit. In addition, since the threshold voltage Vt in each of the stages is lowered, the lower limit of the boostable power supply voltage Vdd becomes small, and hence the drive with the low power supply voltage becomes possible.

Next, the description will hereinbelow be given with respect to the device structure of the booster circuit shown in FIG. 13 with reference to FIG. 14.

Figure 14:
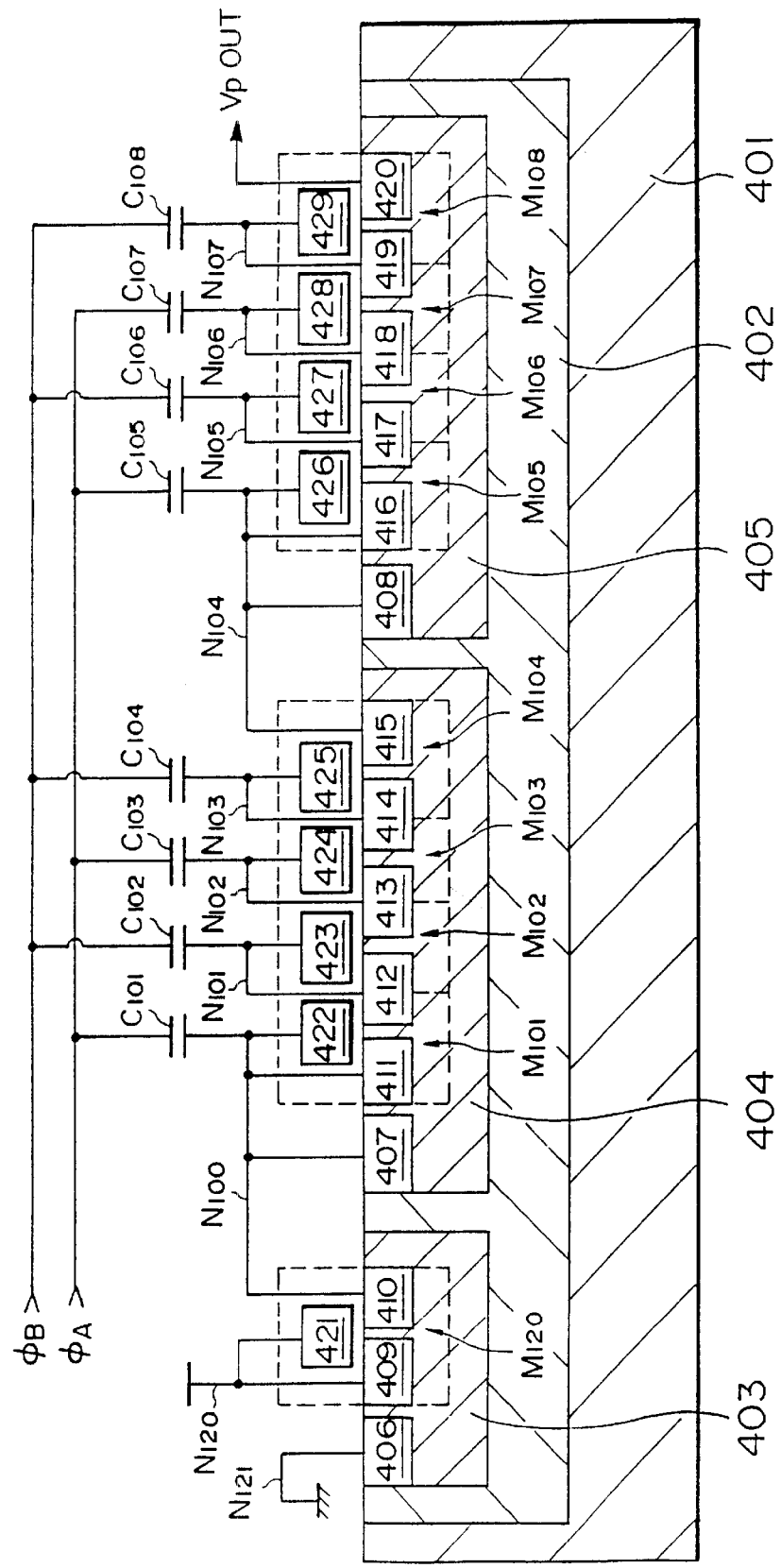
FIG. 14 is a cross sectional view showing a device structure of the semiconductor booster circuit shown in FIG. 13.

As shown in FIG. 14, in an N type well region 402 which is formed in a P type semiconductor substrate 401, P type well regions 403, 404 and 405 are respectively formed. $P^+$ type impurity diffusion layer 406 and $N^+$ type impurity diffusion layers 409 and 410 are respectively formed in the $P^+$ type well region 403, and also a polycrystalline silicon film 421 as a gate electrode is formed above a channel region between the N type impurity diffusion layers 409 and 410 as the drain and the source with an interposed gate oxide film (not shown), thereby constituting the transistor $M_{120}$. In addition, a $P^+$ type impurity diffusion layer 407 and $N^+$ type impurity diffusion layers 411 to 415 are respectively formed in the P type well region 404, and also polycrystalline silicon films 422 to 425 as gate electrodes of the transistors are formed above channel regions between $N^+$ type impurity diffusion layers 411 to 415 constituting the drains or the sources of the transistors with an intermediate gate oxide film (not shown), thereby constituting the four transistors $M_{101}$ to $M_{104}$. In addition, a $P^+$ type impurity diffusion layer 408 and $N^+$ type impurity diffusion layers 416 to 420 are respectively formed in the P type well region, and also polycrystalline silicon films 426 to 429 as gate electrodes of the transistors are formed above channel regions between $N^+$ type impurity diffusion layers 416 to 420 constituting the drains or the sources of the transistors with an intermediate gate oxide film (not shown), thereby constituting the four transistors $M_{105}$ to $M_{108}$.

The polycrystalline silicon films 422 to 425 as the gate electrodes of the transistors $M_{101}$ to $M_{104}$ are respectively connected to the $N^+$ type impurity diffusion layers 411 to 414, and the polycrystalline silicon films 426 to 429 as the gate electrodes of the transistors $M_{105}$ to $M_{108}$ are respectively connected to the $N^+$ type impurity diffusion layers 416 to 419. In addition, the clock signal $\phi_A$ as shown in FIG. 4 is inputted through the capacitors $C_{101}$, $C_{103}$, $C_{105}$ and $C_{107}$, respectively, to the polycrystalline silicon films 422, 424, 426 and 428 as the gate electrodes of the transistors $M_{101}$, $M_{103}$, $M_{105}$ and $M_{107}$ and the clock signal $\phi_B$ which is in opposite phase with the clock signal $\phi_A$ is inputted through the capacitors $C_{102}$, $C_{104}$, $C_{106}$ and $C_{108}$, respectively to the polycrystalline silicon films 423, 425, 427 and 429 as the gate electrodes of the transistors $M_{102}$, $M_{104}$, $M_{106}$ and $M_{108}$. In addition, both the $N^+$ type impurity diffusion layer 409 as the drain and the polycrystalline silicon film 421 as the gate electrode of the transistor $M_{120}$ are connected to the power supply terminal $N_{120}$. The P type well region 403 is connected to the ground terminal. $N_{121}$ through the $P^+$ type impurity diffusion layer 406, and hence the substrate potential of the transistor $M_{120}$ is equal to the potential at the P type well region 403. In addition, the P type well region 404 is connected to both the $N^+$ type impurity diffusion layer 410 as the source of the transistor $M_{120}$ and the $N^+$ type impurity diffusion layer 411 as the drain of the transistor $M_{101}$ through the $P^+$ type impurity diffusion layer 407, and hence the substrate potential of each of the transistors $M_{101}$ to $M_{104}$ is equal to the potential at the P type well region 404. Further, the P type well region 405 is connected to both the $N^+$ type impurity diffusion layer 415 as the source of the transistor $M_{104}$ and the $N^+$ type impurity diffusion layer 416 as the drain of the transistor $M_{105}$ through the $P^+$ type impurity diffusion layer 408, and hence the substrate potential of each of the transistors $M_{105}$ to $M_{108}$ is equal to the potential at the P type well region 405.

Although in the embodiment described above, the substrate portions of the eight transistors $M_{101}$ to $M_{108}$ constituting the booster circuit are divided into two groups, the number of groups is not limited thereto. For example, the substrate portions are divided by every stage, and thus the four groups may be formed. But, if each division is too small, although the boosting efficiency is improved, there arises a problem that the integration of the elements can not be increased. Incidentally, although the above-mentioned embodiment has the circuit configuration having the four stages, it is to be understood that the number of stages is not limited thereto.

Next, the description will hereinbelow be given with respect to a seventh embodiment of the present invention with reference to FIGS. 15 and 17.

Figure 15:
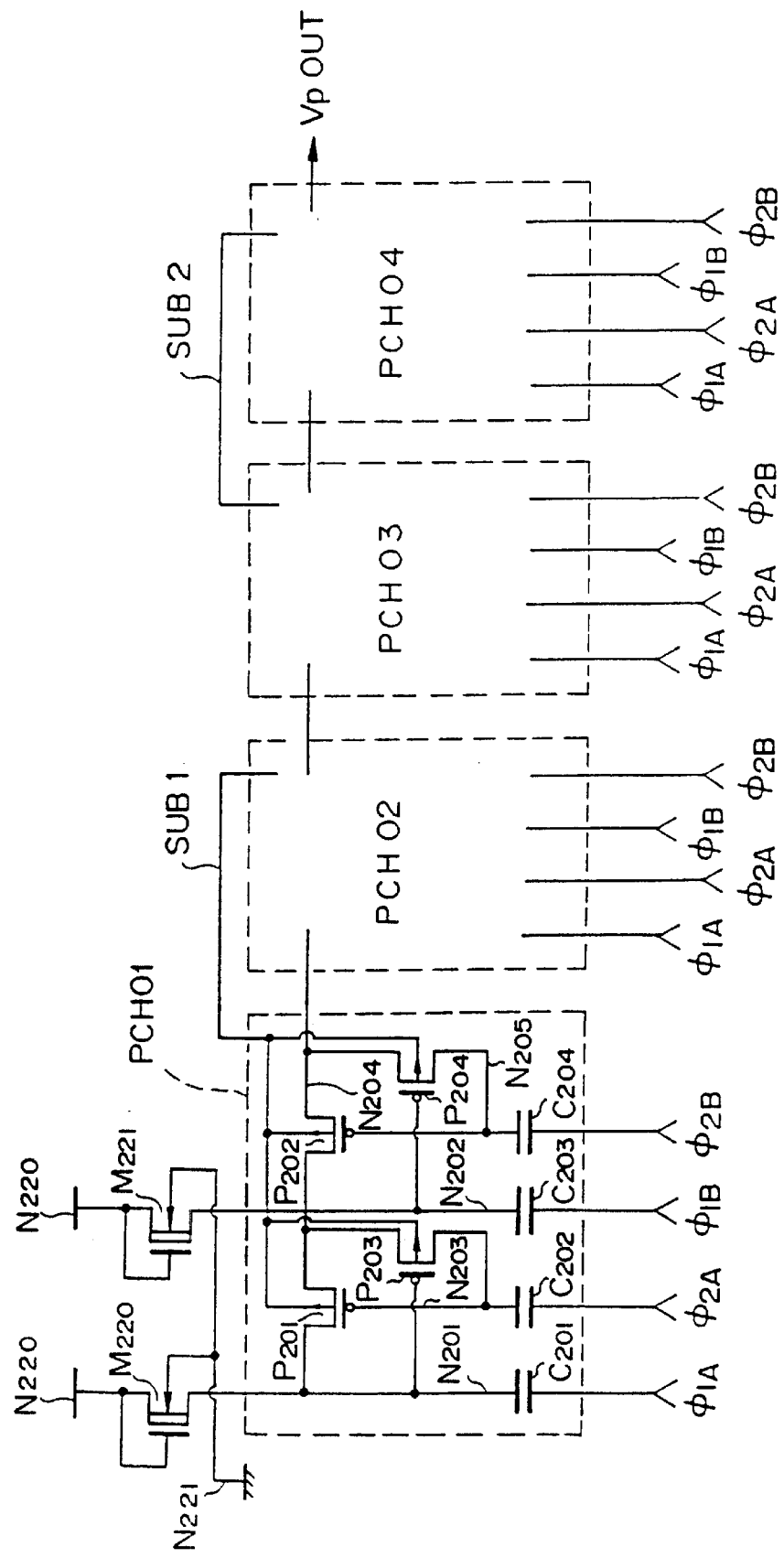
FIG. 15 is a circuit diagram showing a configuration of a semiconductor booster circuit according to a seventh embodiment of the present invention.

As shown in FIG. 15, four circuit blocks $PCH_{01}$ to $PCH_{04}$ are connected in cascade to configure the semiconductor booster circuit according to the seventh embodiment of the present invention. Each of the circuit blocks $PCH_{01}$ to $PCH_{04}$ is configured by connecting P-channel MOS transistors $P_{201}$ and $P_{202}$ in series with each other. Now, to a drain terminal $N_{201}$ of the transistor $P_{201}$, a clock signal $\phi_{1A}$ which is shown in FIG. 17 is inputted through a capacitor $C_{201}$. To a gate terminal $N_{203}$ of the transistor $P_{201}$, a clock signal $\phi_{2A}$ shown in FIG. 17 is inputted through a capacitor $C_{202}$. To a drain terminal $N_{202}$ of the transistor $P_{202}$, a clock signal $\phi_{1B}$ is inputted through a capacitor $C_{203}$. In addition, to a gate terminal $N_{205}$ of the transistor $P_{202}$, a clock signal $\phi_{2B}$ is inputted through a capacitor $C_{204}$. Further, a P-channel MOS transistor $P_{203}$ is connected between the source terminal $N_{204}$ and the gate terminal $N_{203}$ of the transistor $P_{201}$, and the gate terminal of the transistor $P_{203}$ is connected to the drain terminal $N_{201}$ of the transistor $P_{201}$. In addition, a P-channel MOS transistor $P_{204}$ is connected between the source terminal $N_{204}$ and the gate terminal $N_{205}$ of the transistor $P_{202}$, and the gate terminal of the transistor $P_{204}$ is connected to the drain terminal $N_{202}$ of the transistor $P_{202}$.

In addition, drain terminals and gate terminals of N-channel depletion type MOS transistors $M_{220}$ and $M_{221}$ are respectively connected to a power supply terminal $N_{220}$, substrate terminals thereof are connected to a ground terminal $N_{221}$, and source terminals thereof are respectively connected to the drain terminals $N_{201}$ and $N_{202}$ of the transistors $P_{201}$ and $P_{202}$ in the circuit block $PCH_{01}$. Incidentally, instead of the N-channel depletion type MOS transistors $M_{220}$ and $M_{221}$, N-channel enhancement type MOS transistors may also be used.

Substrate terminals of the four transistors $P_{201}$ to $P_{204}$ in the circuit blocks $PCH_{01}$ and $PCH_{02}$ are connected to a substrate terminal $SUB_1$ formed of a common N type well region, and the substrate terminal $SUB_1$ is connected to a source terminal (not shown) of the transistor $P_{204}$ in the circuit block $PCH_{02}$. On the other hand, substrate terminals of four transistors $P_{201}$ to $P_{204}$ in the circuit blocks $PCH_{03}$ and $PCH_{04}$ are connected to a substrate terminals $SUB_2$ formed of a common N type well region and the substrate terminal $SUB_2$ is connected to the source terminal (not shown) of the transistor $P_{204}$ in the circuit block $PCH_{04}$. Incidentally, the substrate terminals $SUB_1$ and $SUB_2$ are electrically insulated from each other.

The source terminal $N_{204}$ of the transistor $P_{202}$ in the circuit block $PCH_{01}$ is connected to the drain terminal $N_{201}$ of the transistor $P_{201}$ in the circuit block $PCH_{02}$, the source terminal $N_{204}$ of the transistor $P_{202}$ in the circuit block $PCH_{02}$ is connected to the drain terminal $N_{201}$ of the transistor $P_{201}$ in the circuit block $PCH_{03}$, and the source terminal $N_{204}$ of the transistor $P_{202}$ in the circuit block $PCH_{03}$ is connected to the drain terminal $N_{201}$ of the transistor $P_{201}$ in the circuit block $PCH_{04}$ so that the four circuit blocks $PCH_{01}$ to $PCH_{04}$ are connected in cascade. In addition, the source terminal of the transistor $P_{202}$ in the circuit block $PCH_{04}$ is connected to an output terminal to provide the output voltage $V_{POUT}$.

Next, the description will hereinbelow be given with respect to the operation of the semiconductor booster circuit according to the seventh embodiment of the present invention. Incidentally, in the following description, it is meant by "smaller than the threshold voltage" that the potential at the drain or the source is lower than that at the gate, or the potential at the source or the drain is higher than that at the gate, but the difference therebetween is smaller than the threshold voltage. By "larger than the threshold voltage", it is meant that the potential at the source or the drain is higher than that at the gate and additionally the difference therebetween is larger than the threshold voltage.

Figure 17:
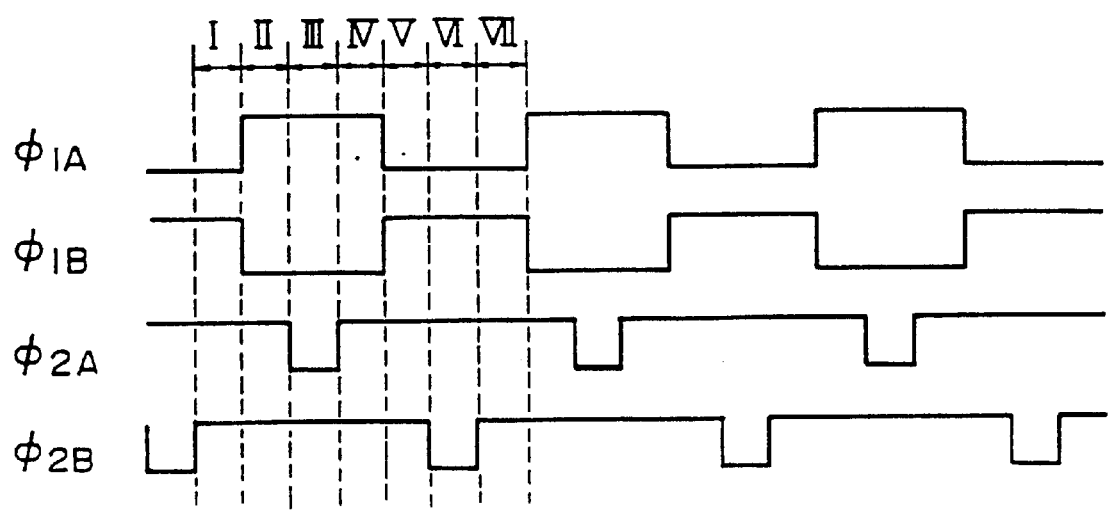
FIG. 17 is a timing chart showing clock pulses used in the semiconductor booster circuit shown in FIG. 15.
Figure 18:
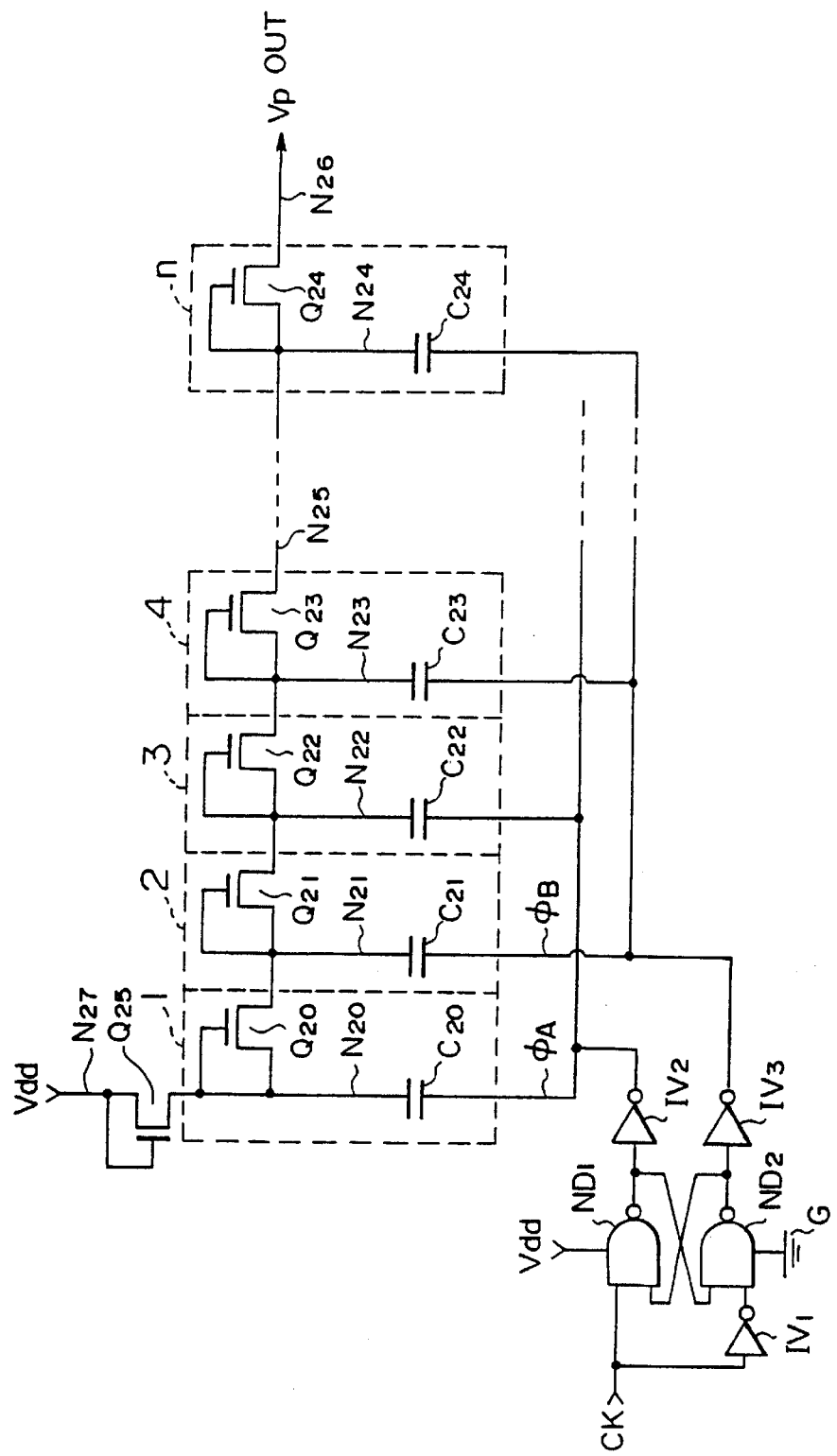
FIG. 18 is a circuit diagram showing a configuration of a conventional semiconductor booster circuit.
Figure 19:
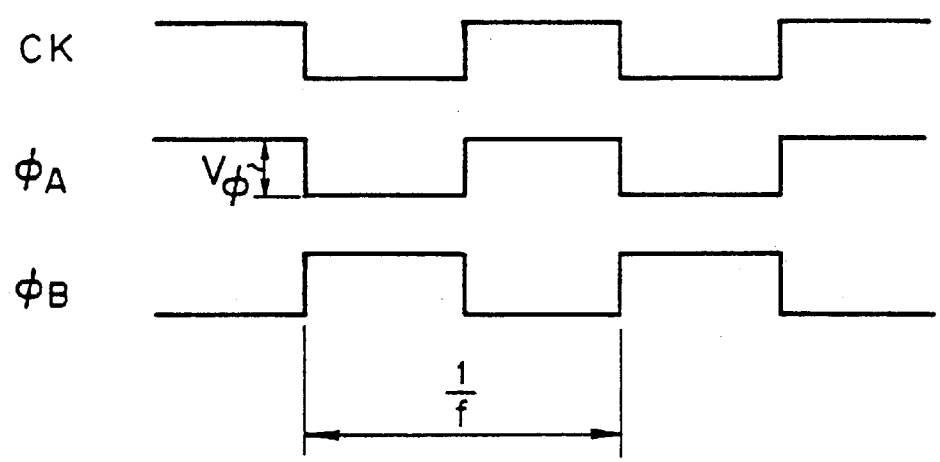
FIG. 19 is a timing chart showing clock pulses used in the conventional prior art semiconductor booster circuit.
Figure 20:
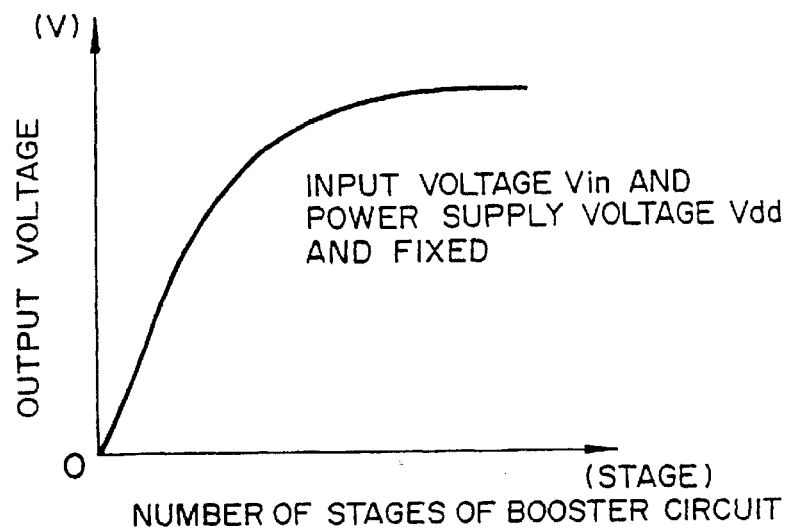
FIG. 20 is a graphical representation showing the relationship between the number of stages and an output voltage of the conventional prior art semiconductor booster circuit.

Firstly, for a period of time of (I) of FIG. 17, the level of the clock signal $\phi_{1A}$ is the low potential ("L"), and the level of each of the clock signals $\phi_{2A}$, $\phi_{1B}$ and $\phi_{2B}$ are the high potential ("H"). Thus, a current is caused to flow from the power supply terminal $N_{220}$ shown in FIG. 15 to the drain terminal $N_{201}$ of the transistor $P_{201}$ through the transistor $M_{220}$, and hence the electric charges are accumulated in the capacitor $C_{201}$. The potential at the drain terminal $N_{202}$ of the transistor $P_{202}$ is higher than its previous potential existing when the level of the clock signal 1B was previously "L" by $V_\phi$ C/(C+Cs) ($V_\phi$ is the amplitude of each of the clock signals $\phi_{1A}$ and $\phi_{1B}$) shown in the above-mentioned expression (1). Thus, if the relation in magnitude between the potential at the drain terminal $N_{201}$ of the transistor $P_{201}$ and the potential at the drain terminal $N_{202}$ of the transistor $P_{202}$ becomes larger than the threshold value of the transistor $P_{203}$, the transistor $P_{203}$ is turned on, and hence the conduction is established between the gate terminal $N_{203}$ of the transistor $P_{201}$ and the drain terminal $N_{202}$ of the transistor $P_{202}$. At this time, since the potential between the gate terminal $N_{203}$ and the drain terminal $N_{201}$ or the source terminal $N_{202}$ of the transistor $P_{201}$ is lower than the threshold voltage of the transistor $P_{201}$, the transistor $P_{201}$ is turned off. In addition, both the transistors $P_{202}$ and $P_{204}$ are turned off since the potential between the gate terminal and the drain terminal or the source terminal is lower than the threshold voltage.

Next, when the operation proceeds from a period of time of (I) to a period of time of (II), the level of each of the clock signals $\phi_{2A}$ and $\phi_{2B}$ remains "H", and also the level of the clock signal $\phi_{1A}$ is changed from "L" to "E" and the level of the clock signal $\phi_{1B}$ is changed from "E" to "L". Therefore, the potential at the gate terminal $N_{201}$ of the transistor $P_{203}$ is changed from "L" to "E", and also the potential at the gate terminal $N_{202}$ of the transistor $P_{204}$ is changed from "E" to "L". Then, at the time point when the potential between the gate terminal $N_{201}$ and the drain terminal $N_{202}$ or the source terminal $N_{203}$ of the transistor $P_{203}$ has become lower than the threshold voltage of the transistor $P_{203}$, the transistor $P_{203}$ is switched from the on state to the off state. In addition, at the time point when the potential between the gate terminal $N_{202}$ and the drain terminal $N_{204}$ or the source terminal $N_{205}$ of the transistor $P_{204}$ has become larger than the threshold voltage of the transistor $P_{204}$, the transistor $P_{204}$ is switched from the off state to the on state, and also the conduction is established between the drain terminal $N_{204}$ and the source terminal $N_{205}$ of the transistor $P_{204}$.

Next, when the operation proceeds from a period of time of (II) to a period of time of (III), the level of each of the clock signals $\phi_{1A}$ and $\phi_{2B}$ remains "E", and the level of the clock signal $\phi_{1B}$ remains "L", and also the level of the clock signal $\phi_{2A}$ is changed from "H" to "L". Therefore, the potential at the gate terminal $N_{203}$ of the transistor $P_{201}$ is changed from "H" to "L", and hence at the time point when the potential between the gate terminal $N_{203}$ and the drain terminal $N_{201}$ or the source terminal $N_{202}$ of the transistor $P_{201}$ has become larger than the threshold voltage of the transistor $P_{201}$, the transistor $P_{201}$ is switched from the off state to the on state, a current is caused to flow from the drain terminal $N_{201}$ of the transistor $P_{201}$ to the drain terminal $N_{202}$ of the transistor $P_{202}$, and the potential at the drain terminal $N_{202}$ of the transistor $P_{202}$ is raised.

Next, when the operation proceeds from a period of time of (III) to a period of time of (IV), the level of each of the clock signals $\phi_{1A}$ and $\phi_{2B}$ remains "H", and the level of the clock signal $\phi_{1B}$ remains "L", and also the level of the clock signal $\phi_{2A}$ is changed from "L" to "H". Therefore, the potential at the gate terminal $N_{203}$ of the transistor $P_{201}$ is changed from "L" to "H", and also the transistor $P_{201}$ is switched from the on state to the off state.

Next, when the operation proceeds from a period of time of (IV) to a period of time of (V), the level of each of the clock signals $\phi_{2A}$ and $\phi_{2B}$ remains "E", and also the level of the clock signal $\phi_{1A}$ is changed from "H" to "L", and the level of the clock signal $\phi_{1B}$ is changed from "L" to "H". Therefore, the potential at the gate terminal $N_{201}$ of the transistor $P_{203}$ is changed from "H" to "L", and the potential at the gate terminal $N_{202}$ of the transistor $P_{204}$ is changed from "L" to "H", and at the time point when the potential between the gate terminal $N_{201}$ and the drain terminal $N_{202}$ or the source terminal $N_{203}$ of the transistor $P_{203}$ has become larger than the threshold voltage of the transistor $P_{203}$, the transistor $P_{203}$ is switched from the off state to the on state, and the conduction is established between the drain terminal $N_{202}$ and the source terminal $N_{203}$ of the transistor $P_{203}$. In addition, at the time point when the potential between the gate terminal $N_{202}$ and the drain terminal $N_{204}$ or the source terminal $N_{205}$ of the transistor $P_{204}$ has become smaller than the threshold voltage of the transistor $P_{204}$, the transistor $P_{204}$ is switched from the on state to the off state.

Next, when the operation proceeds from a period of time of (V) to a period of time of (VI), the level of each of the clock signals $\phi_{2A}$ and $\phi_{1B}$ remains "H", the level of the clock signal $\phi_{1A}$ remains "L", and the level of the clock signal $\phi_{2A}$ is changed from "E" to "L". Therefore, the potential at the gate terminal $N_{205}$ of the transistor $P_{202}$ is changed from "H" to "L", and hence at the time point when the potential between the gate terminal $N_{205}$ and the drain terminal $N_{202}$ or the source terminal $N_{204}$ of the transistor $P_{202}$ has become larger than the threshold voltage of the transistor $P_{202}$, the transistor $P_{202}$ is changed from the off state to the on state, a current is caused to flow from the drain terminal $N_{202}$ to the source terminal $N_{204}$ of the transistor $P_{202}$, and the potential at the source terminal $N_{204}$ of the transistor $P_{202}$ is raised.

Next, when the operation proceeds from a period of time of (VI) to a period of time of (VII), the level of each of the clock signals $\phi_{2A}$ and $\phi_{1B}$ remains "H", and also the level of the clock signal $\phi_{1A}$ remains "L", and the level of the clock signal $\phi_{2B}$ is changed from "L" to "H". Therefore, the potential at the gate terminal $N_{205}$ of the transistor $P_{202}$ is changed from "L" to "H", and hence at the time point when the potential relation between the gate terminal $N_{205}$ and the drain terminal $N_{202}$ or the source terminal $N_{204}$ of the transistor $P_{202}$ has become smaller than the threshold voltage of the transistor $P_{202}$, the transistor $P_{202}$ is switched from the on state to the off state.

In the above-mentioned operation, with respect to the transistors $P_{201}$ and $P_{203}$ and the capacitors $C_{201}$ and $C_{202}$ for example, when the potential at the node $N_{201}$ is "E" and the potential at each of the nodes $N_{202}$ and $_{203}$ is "L" (for a period of time of (III)), the transistor $P_{201}$ is turned on, a current is caused to flow from the node $N_{201}$ to the node $N_{202}$, and the potential at the node $N_{202}$ is further raised as compared with its potential at the time before the transistor $P_{201}$ is turned on. Subsequently, when the level of the clock signal $\phi_{1A}$ goes to "L", the level of the clock signal $\phi_{1B}$ goes to "H", and also the potential at the node $N_{201}$ goes to "L" and the potential at the node $N_{202}$ goes to "E" (for a period of time of (i)), the transistor $P_{203}$ is turned on, and the node $N_{202}$ becomes conductive with the node $N_{203}$. Therefore, the potential difference between the source and the gate of the transistor $P_{201}$ becomes zero. At this time, although the potential at the node $N_{201}$ becomes lower than that at the node $N_{202}$, no current is caused to flow between the nodes $N_{202}$ and $N_{201}$ since the transistor $P_{201}$ is turned off. In addition, the potential at the node $N_{202}$ becomes higher than the potential existing when the transistor $P_{201}$ is in the on state by about $V_\phi \cdot C/(C+Cs)$ as shown in the expression (1), and therefore the potential at the node $N_{202}$ becomes higher than the potential existing when the "H" state has been obtained.

The above-mentioned operation is also applicable to the circuit blocks $PCH_{02}$ to $PCH_{04}$, and hence the output potential of the circuit block located at preceding stages or closer to the output terminal becomes higher in the positive direction. That is, the semiconductor booster circuit according to the seventh embodiment is the positive high voltage generating circuit employing the P-channel MOS transistors.

Incidentally, in the semiconductor booster circuit according to the seventh embodiment, for example, since the potential at the substrate terminal $SUB_1$ is higher than the potential at the sources or drains of the transistors $P_{201}$ and $P_{202}$, the absolute value of the threshold voltage is increased due to the substrate effect, and hence both the transistors $P_{201}$ and $P_{202}$ are difficult to be turned on, or there is a possibility that the on-current becomes small. However, the whole substrate potentials are divided into the two potentials, i.e., the potential at $SUB_1$ and the potential at $SUB_2$, whereby the increase of the threshold voltage due to the substrate bias effect is reduced. If the substrate potentials are divided into four blocks and the potential of each block is controlled, the integration becomes poor but the increase of the threshold voltage due to the substrate bias effect can be further reduced.

In the semiconductor booster circuit according to the seventh embodiment, since the voltage drop when transferring the electric charges from the preceding stage to the subsequent stage can be made substantially zero, the larger boosting capability is obtained as compared with the sixth embodiment. In particular, in the case where the power supply voltage Vdd is about 0.8V to 2.0V, the difference in boosting capability between the sixth embodiment and the seventh embodiment becomes remarkably large. For example, in the case where the power supply voltage Vdd is about 0.8V to 2.0V, the number n of stages of the booster circuit required for obtaining a desired output voltage needs to be greatly increased in the booster circuit of the sixth embodiment due to the voltage drop when transferring the electric charges from the preceding stage to the subsequent stage, but in the booster circuit of the seventh embodiment, it is not required at all. For example, in the case where the power supply voltage Vdd is 2.0V, in the sixth embodiment, the number of stages of the booster circuit required for obtaining the output voltage $V_{POUT}$ of 23Vis 20 whereas in the booster 15 circuit of the seventh embodiment, the required number of stages is only 12.

On the other hand, the booster circuit of the sixth embodiment is advantageous as compared with the booster circuit of the seventh embodiment in that the configuration is simpler and also only two kinds of clock signals are required.

Incidentally, it is to be understood that in the above-mentioned embodiments, the various changes may be made. For example, the number of stages of the booster circuit is not limited to four in the above-mentioned embodiment, and hence it may be set to any value determined in accordance with the voltage to be boosted, the circuit scale and the like. In addition, the N-channel depletion type MOS transistors $M_{101}$ to $M_{108}$ are exemplarily employed as the transistors constituting the booster circuit in the sixth embodiment and also the P-channel MOS transistors $P_{201}$ to $P_{204}$ are exemplarily employed as the transistors constituting the booster circuit in the seventh embodiment. However, as for those transistors, other transistors such as N-channel enhancement type MOS transistors may also be employed. For example, the N-channel MOS transistors $M_{101}$ to $M_{108}$ in the sixth embodiment may be substituted by P-channel MOS transistors which are formed in the N type well region, and also the power supply terminal $N_{120}$ may be grounded to provide the negative high voltage generating circuit. In addition, the P-channel MOS transistors $P_{201}$ to $P_{204}$ in the seventh embodiment may be substituted by N-channel MOS transisters which are formed in the P type well region to provide the negative high voltage generating circuit.

In the sixth and seventh embodiments, the substrate terminals of the MOS transistors constituting the booster circuit are divided into the necessary groups, and also are controlled to the different potentials for the groups, whereby it is possible to prevent the substrate bias effect from occurring. Therefore, the high boosting capability can be obtained and also the increase of the circuit area can be kept to a minimum.

We claim:

1. A semiconductor booster circuit, comprising:
   a plurality of stages each having a MOS transistor, a first capacitor and a second capacitor, said MOS transistor being formed in a well and having a drain, a source and a gate, said first capacitor having one terminal connected to the drain of said MOS transistor, and said second capacitor having one terminal connected to the gate of said MOS transistor;
   said plurality of stages being connected in series between an input terminal and an output terminal by connecting said MOS transistors of said plurality of stages in cascade;
   means for applying a power supply voltage to the drain of said MOS transistor in the stage closest to said input terminal so that said power supply voltage is boosted by said MOS transistor in each of said stages thereby generating a boosted voltage which is higher than said power supply voltage at the source of said MOS transistor in the stage closest to said output terminal;
   a first clock signal generating means for generating a first clock signal, and supplying said first clock signal to another terminal of said first capacitor in each stage; and
   a second clock signal generating means for generating a second clock signal which has a larger amplitude than said power supply voltage, and supplying said second clock signal to another terminal of said second capacitor in each of said plurality of stages; wherein
   in each of said plurality of stages, the source of said MOS transistor is electrically connected to the well in which said MOS transistor is formed; and
   the wells of said plurality of stages are electrically insulated from each other.

2. A semiconductor booster circuit, comprising:
   a plurality of stages, each having a MOS transistor and a capacitor, said MOS transistor being formed in a well and having a drain, a source and a gate, and said capacitor having one terminal connected to the drain of said MOS transistor, wherein
   said plurality of stages are connected in series between an input terminal and an output terminal by connecting said MOS transistors of said plurality of stages in cascade;
   a power supply voltage is applied to the drain of said MOS transistor in the stage closest to said input terminal so that said power supply voltage is boosted by said MOS transistor in each of said stages thereby generating a boosted voltage which is higher than said power supply voltage at the source of said MOS transistor in the stage closest to said output terminal; wherein
     in each of said plurality of stages, the source of said MOS transistor is electrically connected to the well in which said MOS transistor is formed; and
     the wells of said plurality of stages are electrically insulated from each other.

3. A semiconductor booster circuit according to claim 2, wherein
   the wells of said plurality of stages are N-type wells formed in a semiconductor substrate, and are electrically insulated from each other; and
   said MOS transistors of said plurality of stages are P-channel MOS transistors formed in said N-type wells, respectively.

4. A semiconductor booster circuit according to claim 2, wherein
   each of said plurality of stages further has:
     another capacitor having one terminal connected to the gate of said MOS transistor; and
     another MOS transistor connected between the gate and source of said MOS transistor, and having another gate connected to the one terminal of said capacitor.

5. A semiconductor booster circuit according to claim 4, wherein in two adjacent stages of said plurality of stages, a pair of first clock signals, having opposite phase with each other, are inputted to another terminal of said capacitors, respectively; and
   a pair of second clock signals are inputted to another terminal of said another capacitors in different timing with each other, respectively.

6. A semiconductor booster circuit according to claim 2, wherein
   in one stage of said plurality of stages and a subsequent stage of said one stage, the gate of said MOS transistor of said one stage is connected to the one terminal of said capacitor of said subsequent stage; and
   in two adjacent stages of said plurality of stages, a pair of clock signals, having opposite phase with each other, are inputted to another terminals of said capacitors, respectively.

7. A semiconductor booster circuit having MOS transistors connected in cascade, comprising:
   a plurality of stages each having a MOS transistor, a first capacitor one terminal of which is connected to a drain of said MOS transistor, and a second capacitor one of terminal of which is connected to a gate of said MOS transistor, said plurality of stages being connected in series between an input terminal and an output terminal by connecting said MOS transistors of said plurality of stages in cascade;

means for applying a power supply voltage to the drain of said MOS transistor in the stage closest to said input terminal so that said power supply voltage is boosted by said MOS transistor in each of said stages thereby generating a boosted voltage which is higher than said power supply voltage at the source of said MOS transistor in the stage closest to said output terminal;

a first clock signal generating means for generating a first clock signal, and supplying said first clock signal to another terminal of said first capacitor; and a second clock signal generating means for generating a second clock signal which has a larger amplitude than said power supply voltage, and supplying said second clock signal to another terminal of said second capacitor; wherein in each of said plurality of stages, a source of said MOS transistor is electrically connected to a well in which said MOS transistor is formed; and the wells of said plurality of stages are electrically insulated from each other.

8. A semiconductor booster circuit according to claim 7, wherein the wells of said plurality of stages are N-type wells formed in a semiconductor substrate, and are electrically insulated from each other; and said MOS transistors of said plurality of stages are P-channel MOS transistors formed in said N-type wells, respectively.

9. A semiconductor booster circuit according to claim 7, wherein each of said plurality of stages further has another MOS transistor which is connected between the gate and source of said MOS transistor and has a gate connected to the one terminal of said first capacitor.

10. A semiconductor booster circuit according to claim 7, wherein in two adjacent stages of said plurality of stages, said first clock signals inputted to the another terminals of said capacitors, respectively, have opposite phase with each other.

11. A semiconductor booster circuit having MOS transistors connected in cascade, comprising:

a plurality of stages each having a first MOS transistor, a second MOS transistor, a first capacitor having one terminal which is connected to a drain of said first MOS transistor, and a second capacitor having one terminal which is connected to a source of said second MOS transistor; wherein in each of said stages, said first and second MOS transistors are connected in series to constitute a series circuit;

said series circuits, which are constituted in said plurality of stages, respectively, are connected in series between input and output sides of said plurality of stages;

a power supply voltage is applied to the drain of said first MOS transistor in the stage closest to said input side so that said power supply voltage is boosted by said first and second MOS transistors in each of said stages thereby generating a boosted voltage which is higher than said power supply voltage at the source of said second MOS transistor in the stage closest to said output side;

said plurality of stages are divided into at least two groups;

said first and second MOS transistors included in the stages of each group are formed in a well which is formed in a semiconductor substrate; and electrical potentials respectively applied to said wells in said groups are controlled independently of one another.

12. A semiconductor booster circuit according to claim 11, wherein when said booster circuit is a circuit for generating a positive high voltage, a potential which is applied to said well in one group closer to the output side of said plurality of stages is higher than another potential which is applied to said well in the other group.

13. A semiconductor booster circuit according to claim 12, wherein said well of each group is an N-type well which is formed in said semiconductor substrate;

said first and second MOS transistors are P-channel transistors formed in said N-type well; and said N-type wells which are formed in said groups, respectively, are electrically insulated from each other.

14. A semiconductor booster circuit according to claim 11, wherein in each group, said well is connected to the source of one of said first and second MOS transistors which is nearest to the input side.

* * * * *